US012654048B2

(12) United States Patent
Tao et al.

(10) Patent No.: US 12,654,048 B2
(45) Date of Patent: Jun. 16, 2026

(54) SPIRAL WATER INTAKE VALVE AND FIRE-FIGHTING ROBOT

(71) Applicant: SHANDONG FUTURE ROBOT CO., LTD, Weihai (CN)

(72) Inventors: Zewen Tao, Weihai (CN); Yali Wang, Weihai (CN); Pengyu Zhang, Weihai (CN); Jingwei Jiang, Weihai (CN); Xinli Yu, Weihai (CN); Zhenxing Li, Weihai (CN); Songsong Hao, Weihai (CN); Yang Du, Weihai (CN)

(73) Assignee: SHANDONG FUTURE ROBOT CO., LTD, Weihai (CN)

( * ) Notice: Subject to any disclaimer, the term of this patent is extended or adjusted under 35 U.S.C. 154(b) by 275 days.

(21) Appl. No.: 18/694,694

(22) PCT Filed: Jul. 18, 2022

(86) PCT No.: PCT/CN2022/106241

§ 371 (c)(1),
(2) Date: Mar. 22, 2024

(87) PCT Pub. No.: WO2023/001101

PCT Pub. Date: Jan. 26, 2023

(65) Prior Publication Data

US 2024/0390717 A1    Nov. 28, 2024

(30) Foreign Application Priority Data

Jul. 21, 2021    (CN) .......................... 202110822776.1
Nov. 12, 2021    (CN) .......................... 202122766973.4
Jun. 27, 2022    (CN) .......................... 202210735217.1

(51) Int. Cl.
*A62C 27/00*        (2006.01)
*A62C 31/28*        (2006.01)
*F16K 1/32*         (2006.01)
*F16K 27/02*        (2006.01)

(52) U.S. Cl.
CPC .............. *A62C 27/00* (2013.01); *A62C 31/28* (2013.01); *F16K 1/32* (2013.01); *F16K 27/02* (2013.01)

(58) Field of Classification Search
CPC ......... A62C 27/00; A62C 31/24; A62C 31/28; F16K 1/32; F16K 27/02; F16K 31/50; B25J 5/02; B25J 11/00
See application file for complete search history.

(56) References Cited

U.S. PATENT DOCUMENTS 8,381,826 B2 *    2/2013   Al-Azemi .............. A62C 27/00
                                                                169/70
9,623,271 B2 *    4/2017   McLoughlin .......... A62C 33/04
                        (Continued)

FOREIGN PATENT DOCUMENTS

CN          1695751 A      11/2005
CN        101332345 A      12/2008
                (Continued)

OTHER PUBLICATIONS

The World Intellectual Property Organization (WIPO) International Search Report for PCT/CN2022/106241 Oct. 20, 2022 8 Pages (including translation).

*Primary Examiner* — Darren W Gorman
(74) *Attorney, Agent, or Firm* — Scully, Scott, Murphy & Presser, P.C.

(57)            ABSTRACT

The present application discloses spiral water intake valves and fire-fighting robots. The spiral water intake valve includes a valve body. A main valve core and a spiral water intake mechanism are provided in the valve body. The spiral water intake mechanism includes a mating connector and a connecting base. The main valve core includes a main valve sealing base and a main valve screw. A water intake channel is provided in the center part of an upper valve cover of the valve body, the mating connector is provided in the water (Continued)

intake channel, the main valve sealing base is sealedly connected to the upper valve cover, and the main valve screw is threadedly connected to the connecting base. The fire-fighting robot includes a chassis and a track. At least one spiral water intake valve is provided on the track. A valve opening mechanism is provided on the chassis.

24 Claims, 20 Drawing Sheets

(56)                        References Cited

U.S. PATENT DOCUMENTS

| | | | |
|---|---|---|---|
| 2003/0140972 | A1 | 7/2003 | Halvorsen |
| 2011/0186657 | A1* | 8/2011 | Haviland .............. F41B 9/0087 |
| | | | 239/722 |
| 2018/0299055 | A1 | 10/2018 | Thomas et al. |
| 2019/0195412 | A1 | 6/2019 | Attia |
| 2021/0162247 | A1* | 6/2021 | Kovalev ................. A62C 31/12 |
| 2024/0108925 | A1* | 4/2024 | Tang ...................... A62C 31/02 |

FOREIGN PATENT DOCUMENTS

| | | | |
|---|---|---|---|
| CN | 112393044 | A | 2/2021 |
| CN | 113006210 | A | 6/2021 |
| CN | 113404872 | A | 9/2021 |
| CN | 113404873 | A | 9/2021 |
| CN | 214808041 | U | 11/2021 |
| CN | 216343986 | A | 4/2022 |
| EP | 2679869 | A1 | 1/2014 |
| GB | 1097734 | A | 1/1968 |

* cited by examiner

SPIRAL WATER INTAKE VALVE AND FIRE-FIGHTING ROBOT

CROSS REFERENCE TO RELATED APPLICATION

This application is a national phase entry under 35 U.S.C. § 371 of International Application No. PCT/CN2022/106241, filed on Jul. 18, 2022, which claims the priorities to Chinese Patent Application No. 202110822776.1, filed Jul. 21, 2021, Chinese Patent Application No. 202122766973.4, filed Nov. 12, 2021, and Chinese Patent Application No. 202210735217.1 filed Jun. 27, 2022, the entire contents of all of which are incorporated herein by reference.

TECHNICAL FIELD

The present application relates to the technical field of fire-fighting devices, and specifically refers to a spiral water intake valve and a fire-fighting robot.

BACKGROUND

The water source of existing fire trucks or fire protection devices usually comes from fire-fighting water storage tanks, which have limited water capacity. The applicant filed a patent application with the publication number CN113404872A on Jul. 21, 2021, titled Track Water Valve. The track water valve includes a valve body, and a main valve core is provided in the valve body. It is characterized in that: a pilot valve mechanism is provided in the main valve core; the pilot valve mechanism includes a pilot valve, a pilot base, and a pilot spring; a water flow channel is provided in the valve body; a water intake channel is provided in the middle of an upper valve cover of the valve body; a pilot valve is provided in the main valve core; the main valve core includes a main valve connection stand and a main valve guide stand; an upper end of the valve connection stand is sealed against a lower end of the upper valve cover; a pilot channel is provided in the main valve connection stand; a lower end of the main valve connection stand is fixedly connected to an upper end of the main valve guide stand; a water inlet hole is provided on an outer wall of the upper end of the main valve guide stand in a spaced-apart way; a pilot base is provided at a lower end of the main valve guide stand; a guide channel is provided in the main valve guide stand; the three channels, i.e., the guide channel, the pilot channel, and the water intake channel are connected; the guide channel is connected with a water flow channel through the water inlet hole; the diameter of the guide channel is larger than the diameter of the pilot channel; the upper end of the pilot valve extends out of the main valve connection stand and is placed in the water intake channel; the middle part of the pilot valve is sealed against and slidably connected to the pilot channel; a lower end of the pilot valve extends into the guide channel and is slidingly connected to the guide channel; the outer diameter of an upper end of the pilot valve is smaller than the outer diameter of the middle part of the pilot valve; the lower end of the pilot valve is provided with a pilot spring; an upper end of the pilot spring abuts a lower end surface of the pilot valve; a lower end of the pilot spring abuts the pilot base; the pilot base is fixedly connected to the main valve guide stand; after the pilot valve is pressed, the pilot valve squeezes the pilot spring and moves downward, and the water in the water flow channel enters the guide channel and the pilot channel through the water inlet hole and flows out through the water intake channel.

Existing fire-fighting water intake mechanisms are usually relatively complex. For example, Chinese patent CN1695751B discloses an orbital water intake and fire-fighting water cannon vehicle, which mainly includes a water delivery track, and a water cannon vehicle including a driving system, a connecting water intake system, a steering system, a control system, and a communication system. The main features lie in that: a water pipe is installed in the water delivery track; one-way valve-sheet water valves are installed at intervals on the water pipe; water valve outlets are provided on the lower plane of the track; parallel tracks are installed on both sides of the water pipe; conductive strips and positioning pieces are installed on the upper part of the track; a connecting plate is installed on the side; a guide piece is installed on the connecting plate; wheels of the water cannon vehicle are installed in the tracks on both sides; the stepper motor on the frame is equipped with a driving gear; the driving gear and the wheel gear fixed to the frame are linked through an engaged transmission gear; the middle part of the water cannon vehicle frame is equipped with a guide pipe, the lower part of the guide pipe is equipped with a horizontal rotating pipe, and the upper part is equipped with a connecting pipe; the inner ring of the connecting pipe is designed with a reciprocating oil seal groove, and the plane of the pipe has a valve ejector rod and a sealing gasket; two rows of teeth are provided on the side and engaged with two turbine gear rods (in forward and reverse directions); the turbine gear teeth on the other side of the turbine gear rods are meshed on the worms with forward and reverse threads; when engaged, the worms rotate to drive the two forward and reverse turbine gear rods to rotate, which drives the connecting pipe to rise and open the water valve to complete the connection; the vehicle uses the positioning switch on the frame to sense the position of the positioning piece, that is, the connecting position of the water valve inlet; a sealing gasket is installed around the water outlet on the bottom of the one-way water valve box, and a sealing gasket is installed on the bottom of the valve plate; a guide rod is provided in the center of the valve plate; the guide rod is inserted in the round holes in the center of the single-piece guide frame and the four-sided guide frame; the guide rods is inserted in a compression spring; the frame is equipped with a signal connecting plate with contacts, followed by a camshaft and a motor; a ring gear is installed on the horizontal rotating pipe; the ring gear engages with the turbine fixed on the frame; a vertical rotating motor is installed in the middle of the horizontal rotating pipe; the turbine fixed on the motor shaft drives the ring gear on the water cannon pipe to rotate through the transmission wheel; a cable trough is designed on the horizontal rotating pipe and fixed with cables; a reel box is installed at the horizontal position of the cable trough; a reel is installed on the central axis of the box; a coil spring is installed in the reel; the reel is wrapped with the cable; two pulleys are installed at the entrance of the reel box; the gear on the reel shaft engages with the timing gear; a cam is installed coaxially on the reel shaft; a signal switch is installed at a parallel position of the cam; a spiral guide wire is installed at the outlet of the reel; a rack is installed in the track; a driving gear is installed on the stepping motor shaft of the water cannon vehicle to engage with the rack; a synchronous wheel installed on the motor shaft links a synchronous wheel and the driving gear on the other side through a synchronous belt; the water cannon vehicle is equipped with water cannons at the front and rear, which are connected through water pipes; a connecting pipe is provided between the water pipes.

SUMMARY

A first aspect of the present application provides a spiral water intake valve.

The spiral water intake valve includes a valve body, and a main valve core is provided in the valve body. A spiral water intake mechanism is provided in the valve body, the spiral water intake mechanism includes a mating connector and a connecting stand, the main valve core includes a main valve sealing stand and a main valve screw, the mating connector is provided at an upper end of the main valve sealing stand, a lower end of the main valve sealing stand is fixedly connected to the main valve screw, a water intake channel is provided in a center part of an upper valve cover of the valve body, the mating connector is placed in the water intake channel, a lower end of the mating connector is fixedly connected to the main valve sealing stand, the main valve sealing stand is connected to the upper valve cover in a sealed way, a connecting stand is provided at a lower end of the main valve screw, a guide groove is provided in a center part of the connecting stand, a water permeable hole is provided at a lower end of the connecting stand, the lower end of the connecting stand is connected to a lower valve cover of the valve body in a sealed and fixed way, an inner wall of the guide groove is provided with threads, the water permeable hole is connected with the guide groove, and the lower end of the main valve screw is placed in the guide groove and threadedly connected to the connecting stand.

In exemplary embodiments of the present application, guide blocks are circumferentially arranged on an upper end surface of the main valve sealing stand with an axis of the main valve screw as a center, a lower end of the guide block is fixedly connected to the main valve sealing stand, an outer end surface of the guide block is inclined outward from top to bottom; when the main valve sealing stand rises, the main valve sealing stand is connected to the upper valve cover in a sealed way, and an outer wall of the guide block abuts an inner wall of the water intake channel for position limiting.

In exemplary embodiments of the present application, a guide ring is provided on the upper end surface of the main valve sealing stand, an outer end surface of the guide ring is inclined outward from top to bottom, a lower end of the guide ring is fixedly connected to the main valve sealing stand; when the main valve sealing stand rises, the main valve sealing stand is connected to the upper valve cover in a sealed way, and an outer wall of the guide ring abuts an inner wall of the water intake channel for position limiting.

In exemplary embodiments of the present application, a connecting sleeve is provided between the main valve screw and the connecting stand, the connecting sleeve is placed in the guide groove, an outer wall of the connecting sleeve is fixedly connected to the guide groove, and an inner wall of the connecting sleeve is provided with threads, the connecting sleeve is threadedly connected to the main valve screw.

In exemplary embodiments of the present application, the mating connector has a tapered or polygonal shape.

In exemplary embodiments of the present application, a sealing gasket is fixedly provided on the main valve sealing stand, and the main valve sealing stand is connected to the upper valve cover of the valve body through the sealing gasket in a sealed way.

In exemplary embodiments of the present application, the sealing gasket is in a form of a sleeve, the sealing gasket is placed on the main valve sealing stand and is fixedly connected to the main valve sealing stand, and the upper end of the main valve sealing stand is connected to the upper valve cover through the sealing gasket.

Another aspect of the present application provides a fire-fighting robot. The fire-fighting robot include a chassis and a track, where a control cabin and a water cannon are provided on the chassis, a traveling mechanism is provided at a lower end of the chassis, the traveling mechanism cooperates with the track, and a control system is provided in the control cabin. The fire-fighting robot is characterized in that: at least one spiral water intake valve as described above is provided on the track, the spiral water intake valve is fixedly connected to the track, a valve opening mechanism is provided on the chassis, the valve opening mechanism includes a fixing stand and a valve shaft, the fixing stand is fixedly connected to a base frame of the chassis, a valve shaft hole is provided in the fixing stand, a water inlet channel is provided in the fixing stand, a water outlet channel is provided on one side of the fixing stand, one end of the water outlet channel is connected to a water inlet of the water cannon, the other end of the water outlet channel is connected to the water inlet channel, the valve shaft is placed in the valve shaft hole and is connected to the valve shaft hole in a sealed and slidable way, an upper end of the valve shaft passes through the fixing stand, the fixing stand is provided with a lifting and rotating mechanism, a lower end of the valve shaft is provided with a valve opening wrench, the valve shaft is connected to the lifting and rotating mechanism, the lifting and rotating mechanism is connected to a control system, an upper end of the valve opening wrench is fixedly connected to the valve shaft, a lower end of the valve opening wrench extends out of the water inlet channel and is mated with and connected to the mating connector of the spiral water intake valve, the valve opening mechanism is connected to the spiral water intake valve, the water inlet channel is connected with a water intake channel, the lifting and rotating mechanism drives the valve shaft and the valve opening wrench, the valve opening wrench drives the main valve core to rotate downward to be separated from an upper valve cover, so that the water in the track enters the water inlet channel through the water intake channel, and then enters the water cannon through the water outlet channel.

In exemplary embodiments of the present application, a sealing connection mechanism is provided between the spiral water intake valve and the valve opening mechanism.

In exemplary embodiments of the present application, the sealing connection mechanism includes a sliding sealing sleeve, a sealing ring, a left rack plate, a right rack plate, fixing brackets, a left gear, a left gear shaft, a left worm wheel, a right gear, a right gear shaft, a right worm wheel, a worm shaft, and a worm motor. The sliding sealing sleeve is provided on the outside of the fixing stand, an inner wall of the sliding sealing sleeve is connected with an outer wall of the fixing stand in a sealed and slidable way, a sealing ring is fixedly provided at a lower end of the sliding sealing sleeve, the sliding sealing sleeve falls such that the sealing ring is abutted against and connected to the upper valve cover of the spiral water intake valve in a sealed way, the left rack plate and the right rack plate are provided on a left side and a right side of the sliding sealing sleeve, the fixing brackets are provided on a front side and a rear side of the sliding sealing sleeve respectively, the fixing brackets are fixedly connected to the base frame, a right end of the left rack plate is fixedly connected to the sliding sealing sleeve, the left gear is provided at a left end of the left rack plate, the left gear engages with an upper rack of the left rack plate, the left gear is fixed on the left gear shaft, two ends of the left gear shaft are fixedly connected to the fixing brackets on both sides through bearings, the left worm wheel is fixedly provided at one end of the left gear shaft that passes through and extends out of the fixing bracket, a left end of the right rack plate is fixedly connected to the sliding sealing sleeve, the right gear is provided at a right end of the right rack plate, the right gear engages with an upper rack of the right rack plate, the right gear is fixed on the right gear shaft, two ends of the right gear shaft are fixedly connected to the fixing brackets on both sides through bearings, the right worm wheel is fixedly provided at one end of the right gear shaft that passes through and extends out of the fixing bracket, the worm shaft is provided on the left worm wheel and the right worm wheel, left helical teeth and right helical teeth are fixed at intervals on the worm shaft, a helical direction of the left helical teeth is opposite to a helical direction of the right helical teeth, the left helical teeth engage with the left worm wheel, the right helical teeth engage with the right worm wheel, two ends of the worm shaft are fixedly connected to the fixing bracket through bearings, one end of the worm shaft that passes through and extends out of the fixing bracket is driven by the worm motor, and the worm motor is fixed on the base frame and connected to the control system.

In exemplary embodiments of the present application, the limiting and fixing mechanism is provided between the spiral water intake valve and the valve opening mechanism, the limiting and fixing mechanism includes hook plate frames, guide sliding mechanisms, hook plates, limit plates, and eccentric wheels, the hook plate frames are provided in a front side and a back side of the sliding sealing sleeve respectively, guide sliding mechanisms are provided between the hook plate frame and the fixing bracket, the hook plate frame is slidably connected to the fixing bracket through the guide sliding mechanism, a lower end of the hook plate frame extends toward a center of the sliding sealing sleeve to form the hook plate, a front side and a rear side of the upper valve cover of the spiral water intake valve extend outward to form the limit plates, limiting wheel holes are provided in the hook plate frame at intervals, the eccentric wheels are fixedly provided at a front end and a rear end of the left gear shaft, the eccentric wheels are fixedly provided at a front end and a rear end of the right gear shaft, the eccentric wheels are placed in the limiting wheel holes, when a top of the eccentric wheel turns from a proximal end to a distal end with respect to the center, the hook plate frame moves upward with the eccentric wheel, and an upper end surface of the hook plate abuts a lower end surfaces of the limit plate to realize a position-limited fixed connection between the fixing bracket and the spiral water intake valve.

In exemplary embodiments of the present application, the valve shaft is provided with a detection hole in an axial direction, the valve shaft is provided with an in-place sensor and an in-place probe rod from top to bottom, the in-place sensor is fixedly connected to an inner wall of the valve shaft in a sealed way, the in-place probe rod is provided below the in-place sensor, a baffle ring is fixedly provided on the inner wall of the valve shaft below the in-place sensor, the in-place sensor is connected to the control system, an outer diameter of an upper part of the in-place probe rod is less than an outer diameter of a middle part of the in-place probe rod, the outer diameter of the middle part of the in-place probe rod is less than an inner diameter of the baffle ring, a limit spring is provided between the upper part of the in-place probe rod and the baffle ring, the limit spring is fitted over the upper part of the in-place probe rod as a sleeve in a compressed state, an upper end of the in-place probe rod passes through the limit spring and the baffle ring and is placed below the in-place sensor, the in-place probe rod is slidably connected to the valve shaft, a lower end of the in-place probe rod passes through the valve shaft and is connected to the valve opening wrench. After the valve opening wrench is connected to the mating connector, the mating connector may drive the in-place probe rod to move upward to be sensed by the in-place sensor.

In exemplary embodiments of the present application, a probe rod hole is provided in a middle of the valve opening wrench, the probe rod hole is connected with the detection hole, a joint connecting groove is provided at a lower end of the valve opening wrench, the joint connecting groove is matched with and connected to the mating connector, an upper end of the joint connecting groove is connected with the probe rod hole, the outer diameter of a lower part of the in-place probe rod is less than the outer diameter of the middle part of the in-place probe rod, the probe rod hole is smaller than the outer diameter of the middle part of the in-place probe rod, the lower end of the in-place probe rod passes through the probe rod hole and is placed in the joint connecting groove to abut the mating connector, so that when the valve opening wrench and the mating connector are connected in place, the mating connector abuts the in-place probe rod to moves it upward until it is sensed by the in-place sensor and connected in place.

In exemplary embodiments of the present application, a driving block is radially fixedly provided at an outer wall of the lower end of the valve opening wrench, a baffle block is fixedly provided at the upper end of the main valve sealing stand. After the valve opening wrench is connected to the mating connector, the driving block abuts the baffle block, thereby driving the main valve sealing stand to rotate and move up and down, so that the valve opening wrench drives the main valve core to move synchronously through the driving block and the baffle block.

In exemplary embodiments of the present application, the valve opening wrench is a universal sleeve, the lower end of the in-place probe rod passes through the valve shaft and is fixedly connected to a core rod of the universal sleeve, so that when the universal sleeve is connected to the mating connector, the mating connector presses the core rod of the universal sleeve upward, so that the core rod drives the in-place probe rod to move upward to be sensed by the in-place sensor.

In exemplary embodiments of the present application, the lifting and rotating mechanism includes a ball spline pair, a bearing, a bearing stand, a spline pulley, a ball screw pair, a transmission connecting rod, and a driving mechanism. The ball spline pair is provided at the upper end of the valve shaft, the upper end of the valve shaft is fixedly connected to a lower end of a spline shaft of the ball spline pair, an upper end of the spline shaft is fixedly connected to the bearing stand through a bearing, a spline shaft nut of the ball spline pair is fixedly connected to the fixing stand through a bearing, the spline pulley is fixedly provided on an outer wall of the spline shaft nut, the ball screw pair is provided on one side of the bearing stand, the bearing stand is fixedly connected to a nut of the ball screw pair through the transmission connecting rod, and a screw of the ball screw pair is connected to the fixing stand through a bearing and a bracket, the spline pulley and the screws of the ball screw pair are respectively driven by the driving mechanism.

In exemplary embodiments of the present application, the driving mechanism may include a ball screw driving motor and a ball spline driving motor, the ball screw driving motor and the ball spline driving motor are respectively connected to the control system, and the screw of the ball screw pair is driven by the ball screw driving motor, the spline pulley is driven by the ball spline driving motor through gear transmission.

In exemplary embodiments of the present application, the spline pulley is connected to a spline driving pulley through a synchronous belt, the spline driving pulley is fixed on a spline driving pulley shaft, a bidirectional torque limiter is mounted on the spline driving pulley shaft, and the bidirectional torque limiter is connected to the control system.

In exemplary embodiments of the present application, the driving mechanism may also include a main driving motor, a first driving gear, a clutch, a second driving gear, a first driven gear, a synchronous belt, a spline driving pulley, a spline driving pulley shaft, and the second driven gear, the main driving motor is provided on one side of the fixing stand, the main driving motor is connected to the control system, the main driving motor is connected to the fixing stand through a bracket, the first driving gear and the clutch are separated from each other and provided on an output shaft of the main driving motor, the first driving gear is fixedly connected to the output shaft of the main driving motor, the first driving gear engages with the first driven gear, the first driven gear is fixedly connected to the screw of the ball screw pair, the clutch is fixedly connected to the output shaft of the main driving motor, the clutch is connected to the control system, the second driving gear is fixed on an output shaft of the clutch, the spline pulley is connected to the spline driving pulley through the synchronous belt, the spline driving pulley is fixed on the spline driving pulley shaft, a second driven gear is provided at a lower end of the spline driving pulley shaft, the second driven gear is fixedly connected to the spline driving pulley shaft, and the second driven gear engages with the second driving gear.

In exemplary embodiments of the present application, a sealing plate is provided at a lower end of the valve shaft hole, and the valve shaft is connected with the sealing plate in a sealed way.

In exemplary embodiments of the present application, the screw of the ball screw pair is fixedly connected to a bracket through a bearing and a screw bearing stand, the bracket is fixedly connected to the fixing stand, a valve closing sensor is provided on the screw bearing stand at an upper end of the screw, the valve closing sensor is connected to the control system, a sensing block is fixedly provided on the transmission connecting rod, and the sensing block cooperates with the valve closing sensor, such that when the screw rises and the valve shaft returns in place, the sensing block contacts the valve closing sensor, such that the valve closing sensor senses the sensing block to confirm that the valve is closed in place.

In exemplary embodiments of the present application, limit baffles are respectively provided on a front side and a rear side of a lower end of the limiting wheel hole, the limiting baffles are fixedly connected to the hook plate frame, a lubricating oil groove is formed between two limiting baffles and the limiting wheel hole, lubricating oil is provided in the lubricating oil groove, when the eccentric wheel rotates, the eccentric wheel comes into contact with the lubricating oil in the lubricating oil groove.

In exemplary embodiments of the present application, at least one pressing mechanism is provided at an upper end of the hook plate frame, the pressing mechanism includes an upper connecting stand, a lower connecting stand, and a spring, at least one lower connecting stand is provided on the hook plate frame, the lower connecting stand is fixedly connected to the hook plate frame, at least one spring is provided on the lower connecting stand, the upper connecting stand is provided on the fixing bracket, the upper connecting stand is fixedly connected to the hook plate frame, the upper connecting stand is opposite to the lower connecting stand, the spring is in a compressed state, one end of the spring is fixedly connected to the upper connecting stand, and the other end of the spring is fixedly connected to the lower connecting stand.

In exemplary embodiments of the present application, the upper connecting stand is provided with at least one upper spring groove opening downward, the lower connecting stand is provided with at least one lower spring groove opening upward, one end of the spring is placed in the upper spring groove and is fixedly connected to the upper spring groove, and the other end of the spring is placed in the lower spring groove and fixedly connected to the lower spring groove.

In exemplary embodiments of the present application, the guide sliding mechanism includes first sliding bars and a sliding limit block, the sliding limit block is provided at a middle part of the fixing bracket, a guide groove is provided at a middle part of the hook plate frame, the first sliding bars are respectively fixedly provided on a left side and a right side of an inner wall of the guide groove, the sliding limit block is placed in the guide groove and is slidably connected to the guide groove through the first sliding bars, and the sliding limit block is fixedly connected to the fixing bracket.

In exemplary embodiments of the present application, the guide sliding mechanism also includes a front and rear limit sliding mechanism, the front and rear limit sliding mechanism includes second sliding bars and sliding limit stands, the sliding limit stands are provided at both ends of the fixing bracket, the sliding limit stands are fixedly connected to the fixing bracket, an open limiting groove facing toward the hook plate frame is provided between the sliding limiting stand and the fixing bracket, second sliding bars are fixedly provided on a front side and a rear side of the open limiting groove respectively, and a left end and a right end of the hook plate frame are respectively placed in the open limiting grooves and are slidably connected to the open limiting grooves through the second sliding bars.

In exemplary embodiments of the present application, a positioning mechanism is provided between the spiral water intake valve and the valve opening mechanism, the positioning mechanism includes positioning blocks and a positioning proximity sensor, the positioning blocks are respectively provided at a left end and a right end of the upper valve cover of the spiral water intake valve, the positioning blocks are fixedly connected to the upper valve cover, the positioning proximity sensor is provided on the base frame above the positioning blocks, the positioning proximity sensor cooperates with the positioning blocks, the positioning proximity sensor is fixedly connected to the base frame, and the positioning proximity sensor is connected to the control system, so that when the base frame approaches the spiral water intake valve from one side of the spiral water intake valve, the positioning block on the left or right side of the spiral water intake valve is sensed by the positioning proximity sensor on the base frame, and the base frame begins to slow down. As the base frame moves, when the positioning block on the right or left side of the spiral water intake valve is sensed by the positioning proximity sensor on the base frame, the base frame stops.

In exemplary embodiments of the present application, an upper end surface of the upper valve cover is provided with a sealing groove, and a lower end of the sealing ring is embedded in the sealing groove to connect the sliding sealing sleeve with the spiral water intake valve in a sealed way.

In exemplary embodiments of the present application, a video intercom device and a flame detector are fixedly provided on the base frame, and the video intercom device and the flame detector are respectively connected to the control system.

In exemplary embodiments of the present application, a protective cover is fixedly provided on an outside of the base frame.

Figure 1:
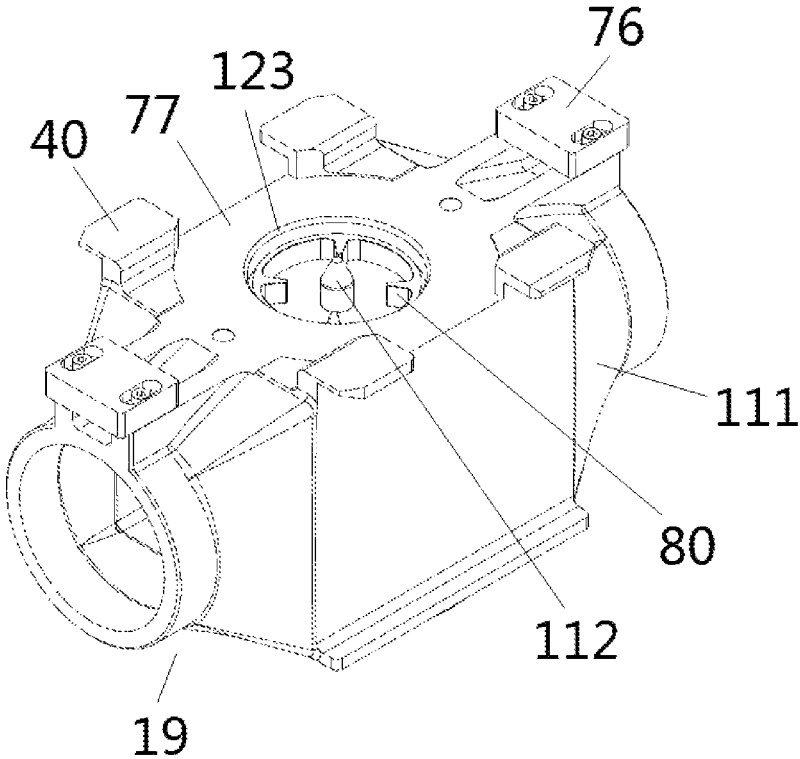
FIG. 1 is a schematic structural diagram of a spiral water intake valve in exemplary embodiments of the present application.

REFERENCE NUMBERS fixing stand 1, valve shaft 2, water inlet channel 3, water outlet channel 4, valve shaft hole 5, lifting and rotating mechanism 6, valve opening wrench 7, in-place sensor 8, in-place probe rod 9, baffle ring 10, limit spring 11, joint connecting groove 12, universal sleeve 13, chassis 14, track 15, mating connector 16, water cannon 17, traveling mechanism 18, spiral water intake valve 19, sealing connection mechanism 20, base frame 21, sliding sealing sleeve 22, sealing ring 23, left rack plate 24, right rack plate 25, fixing bracket 26, left gear 27, left gear shaft 28, left worm wheel 29, right gear 30, right worm wheel 31, worm shaft 32, worm motor 33, left helical teeth 34, right helical teeth 35, limiting and fixing mechanism 36, hook plate frame 37, guide sliding mechanism 38, hook plate 39, limit plate 40, eccentric wheel 41, limiting wheel hole 42, pressing mechanism 43, upper connecting stand 44, lower connecting stand 45, spring 46, ball spline pair 47, bearing stand 48, spline pulley 49, ball screw pair 50, transmission connecting rod 51, driving mechanism 52, spline shaft 53, spline shaft nut 54, nut 55, screw 56, ball screw driving motor 57, ball spline driving motor 58, main driving motor 59, first driving gear 60, second driving gear 61, first driven gear 62, synchronous belt 63, spline driving pulley 64, spline driving pulley shaft 65, second driven gear 66, clutch 67, bidirectional torque limiter 68, sealing plate 69, screw bearing stand 70, valve closing sensor 71, video intercom device 72, flame detector 73, protective cover 74, positioning mechanism 75, positioning block 76, upper valve cover 77, positioning proximity sensor 78, driving block 79, baffle block 80, guide groove 94, limit baffle 95, front and rear limit sliding mechanism 96, first sliding bar 97, sliding limit block 98, second sliding bar 99, valve opening mechanism 100, sliding limit stand 101, valve body 111, main valve core 112, spiral water intake mechanism 113, guide ring 114, connecting stand 115, main valve sealing stand 116, main valve screw 117, guide groove 119, water permeable hole 120, lower valve cover 121, guide block 122, water intake channel 123, connecting sleeve 124, sealing gasket 125.

DESCRIPTION OF EMBODIMENTS

Exemplary embodiments of the present application will be described in further detail below with reference to the accompanying drawings.

In exemplary embodiments, a spiral water intake valve includes a valve body 111, and a main valve core 112 is provided in the valve body 111. The spiral water intake valve is characterized in that: a spiral water intake mechanism 113 is provided in the valve body 111, the spiral water intake mechanism 113 includes a mating connector 16 and a connecting stand 115, the main valve core 112 includes a main valve sealing stand 116 and a main valve screw 117, the mating connector 16 is provided at an upper end of the main valve sealing stand 116, a lower end of the main valve sealing stand 116 is fixedly connected to the main valve screw 117, a water intake channel 123 is provided in a center part of an upper valve cover 77 of the valve body 111, the mating connector 16 is placed in the water intake channel 123, a lower end of the mating connector 16 is fixedly connected to the main valve sealing stand 116, the main valve sealing stand 116 is connected to the upper valve cover 77 in a sealed way, a connecting stand 115 is provided at a lower end of the main valve screw 117, a guide groove 119 is provided in a center part of the connecting stand 115, a water permeable hole 120 is provided at a lower end of the connecting stand 115, the lower end of the connecting stand 115 is connected to a lower valve cover 121 of the valve body 111 in a sealed and fixed way, an inner wall of the guide groove 119 is provided with threads, the water permeable hole 120 is connected with the guide groove 119, and the lower end of the main valve screw 117 is placed in the guide groove 119 and threadedly connected to the connecting stand 115. In exemplary embodiments, this facilitates the connection between the fire-fighting device and the mating connector to then drive the mating connector to rotate, causing the main valve screw to move downward relative to the connecting stand, such that the main valve sealing stand and the upper valve cover separate and thus the water flow out of the valve body.

In exemplary embodiments of the present application, guide blocks 122 are circumferentially arranged on an upper end surface of the main valve sealing stand 116 with an axis of the main valve screw 117 as a center, a lower end of the guide block 122 is fixedly connected to the main valve sealing stand 116, an outer end surface of the guide block 122 is inclined outward from top to bottom, the water intake channel 123 in a center part of the upper valve cover 77 is circular, when the main valve sealing stand 116 rises, the main valve sealing stand 116 is connected to the upper valve cover 77 in a sealed way, and an outer wall of the guide block 122 abuts an inner wall of the water intake channel 123 for position limiting. In exemplary embodiments, this facilitates the contact and abutting between the guide block and the inner wall of the water intake channel, making the main valve core automatically guided and aligned to facilitate mutual connection.

In exemplary embodiments of the present application, a guide ring 114 is provided on the upper end surface of the main valve sealing stand 116, an outer end surface of the guide ring 114 is inclined outward from top to bottom, a lower end of the guide ring 114 is fixedly connected to the main valve sealing stand 116, the water intake channel 123 in a center part of the upper valve cover 77 is circular, when the main valve sealing stand 116 rises, the main valve sealing stand 116 is connected to the upper valve cover 77 in a sealed way, and an outer wall of the guide ring 114 abuts an inner wall of the water intake channel 123 for position limiting. In exemplary embodiments, this facilitates the contact and abutting between the guide ring and the inner wall of the water intake channel, making the main valve core automatically guided and aligned for quick connection.

In exemplary embodiments of the present application, a connecting sleeve 124 is provided between the main valve screw 117 and the connecting stand 115, the connecting sleeve 124 is placed in the guide groove 119, an outer wall of the connecting sleeve 124 is fixedly connected to the guide groove 119, and an inner wall of the connecting sleeve 124 is provided with threads, the connecting sleeve 124 is threadedly connected to the main valve screw 117. In exemplary embodiments, this facilitates protecting the connecting stand by the connecting sleeve, such that the connecting sleeve is easy to disassemble.

In exemplary embodiments of the present application, the mating connector 16 has a tapered or polygonal shape, and an outer diameter of an upper end of the mating connector 16 is smaller than an outer diameter of a lower end of the mating connector 16. In exemplary embodiments, this facilitates realizing the connection quickly and conveniently.

In exemplary embodiments of the present application, a sealing gasket 125 is fixedly provided on the main valve sealing stand 116, and the main valve sealing stand 116 is connected to the upper valve cover 77 of the valve body 111 through the sealing gasket 125 in a sealed way. In exemplary embodiments, this facilitates realizing sealing through the sealing gasket.

In exemplary embodiments of the present application, the sealing gasket 125 is in a form of a sleeve, the sealing gasket 125 is placed on the main valve sealing stand 116 and is fixedly connected to the main valve sealing stand 116, and the upper end of the main valve sealing stand 116 is connected to the upper valve cover 77 through the sealing gasket 125. In exemplary embodiments, this facilitates improving the sealing performance between the main valve sealing stand and the upper valve cover.

A fire-fighting robot includes a chassis 14 and a track 15, where a control cabin and a water cannon 17 are provided on the chassis 14, a traveling mechanism 18 is provided at a lower end of the chassis 14, the traveling mechanism 18 cooperates with the track 15, and a control system is provided in the control cabin. The fire-fighting robot is characterized in that: at least one spiral water intake valve 19 as described above is provided on the track 15, the spiral water intake valve 19 is fixedly connected to the track 15, a valve opening mechanism 100 is provided on the chassis 14, the valve opening mechanism 100 includes a fixing stand 1 and a valve shaft 2, the fixing stand 1 is fixedly connected to a base frame 21 of the chassis 14, a valve shaft hole 5 is provided in the fixing stand 1, a water inlet channel 3 is provided in the fixing stand 1, a water outlet channel 4 is provided on one side of the fixing stand 1, one end of the water outlet channel 4 is connected to a water inlet of the water cannon 17, the other end of the water outlet channel 4 is connected to the water inlet channel 3, the valve shaft 2 is placed in the valve shaft hole 5 and is connected to the valve shaft hole 5 in a sealed and slidable way, an upper end of the valve shaft 2 passes through the fixing stand 1, the fixing stand 1 is provided with a lifting and rotating mechanism 6, a lower end of the valve shaft 2 is provided with a valve opening wrench 7, the valve shaft 2 is connected to the lifting and rotating mechanism 6, the lifting and rotating mechanism 6 is connected to a control system, an upper end of the valve opening wrench 7 is fixedly connected to the valve shaft 2, a lower end of the valve opening wrench 7 extends out of the water inlet channel 3 and is mated with and connected to the mating connector 16 of the spiral water intake valve 19, the valve opening mechanism 100 is connected to the spiral water intake valve 19, the water inlet channel 3 is connected with a water intake channel 123, the lifting and rotating mechanism 6 drives the valve shaft 2 and the valve opening wrench 7, the valve opening wrench 7 drives the main valve core 112 to rotate downward to be separated from an upper valve cover 118, so that the water in the track 15 enters the water inlet channel 3 through the water intake channel 123, and then enters the water cannon through the water outlet channel 4. In exemplary embodiments, this realizes firefighting operations and opening and closing the water valve in a spiral manner, which is maintenance-free, has a long service life and has no performance degradation.

In exemplary embodiments of the present application, a sealing connection mechanism 20 is provided between the spiral water intake valve 19 and the valve opening mechanism 100.

In exemplary embodiments of the present application, the sealing connection mechanism 20 includes a sliding sealing sleeve 22, a sealing ring 23, a left rack plate 24, a right rack plate 25, fixing brackets 26, a left gear 27, a left gear shaft 28, a left worm wheel 29, a right gear 30, a right gear shaft, a right worm wheel 31, a worm shaft 32, and a worm motor 33. The sliding sealing sleeve 22 is provided on the outside of the fixing stand 1, an inner wall of the sliding sealing sleeve 22 is connected with an outer wall of the fixing stand 1 in a sealed and slidable way, a sealing ring 23 is fixedly provided at a lower end of the sliding sealing sleeve 22, the sliding sealing sleeve 22 falls such that the sealing ring 23 is abutted against and connected to the upper valve cover 77 of the spiral water intake valve 19 in a sealed way, the left rack plate 24 and the right rack plate 25 are provided on a left side and a right side of the sliding sealing sleeve 22, the fixing brackets 26 are provided on a front side and a rear side of the sliding sealing sleeve 22 respectively, the fixing brackets 26 are fixedly connected to the base frame 21, a right end of the left rack plate 24 is fixedly connected to the sliding sealing sleeve 22, the left gear 27 is provided at a left end of the left rack plate 24, the left gear 27 engages with an upper rack of the left rack plate 24, the left gear 27 is fixed on the left gear shaft 28, two ends of the left gear shaft 28 are fixedly connected to the fixing brackets 26 on both sides through bearings, the left worm wheel 29 is fixedly provided at one end of the left gear shaft 28 that passes through and extends out of the fixing bracket 26, a left end of the right rack plate 25 is fixedly connected to the sliding sealing sleeve 22, the right gear 30 is provided at a right end of the right rack plate 25, the right gear 30 engages with an upper rack of the right rack plate 25, the right gear 30 is fixed on the right gear shaft, two ends of the right gear shaft are fixedly connected to the fixing brackets 26 on both sides through bearings, the right worm wheel 31 is fixedly provided at one end of the right gear shaft that passes through and extends out of the fixing bracket 26, the worm shaft 32 is provided on the left worm wheel 29 and the right worm wheel 31, left helical teeth 34 and right helical teeth 35 are fixed at intervals on the worm shaft 32, a helical direction of the left helical teeth 34 is opposite to a helical direction of the right helical teeth 35, the left helical teeth 34 engage with the left worm wheel 29, the right helical teeth 35 engage with the right worm wheel 31, two ends of the worm shaft

32 are fixedly connected to the fixing bracket 26 through bearings, one end of the worm shaft 32 that passes through and extends out of the fixing bracket 26 is driven by the worm motor 33, and the worm motor 33 is fixed on the base frame 21 and connected to the control system. In exemplary embodiments, this facilitates starting the worm motor. The worm motor drives the worm shaft, which drives the left gear and the right gear to rotate through the worm gear transmission, which then drives the left rack plate and the right rack plate to move up and down synchronously, realizing the up and down movement of the sliding sealing sleeve. When the sealing ring at the lower end of the sliding sealing sleeve abuts the upper valve cover, the sliding sealing sleeve and the spiral water inlet valve achieve a sealed connection.

In exemplary embodiments of the present application, the limiting and fixing mechanism 36 is provided between the spiral water intake valve 19 and the valve opening mechanism 100, the limiting and fixing mechanism 36 includes hook plate frames 37, guide sliding mechanisms 38, hook plates 39, limit plates 40, and eccentric wheels 41, the hook plate frames 37 are provided in a front side and a back side of the sliding sealing sleeve 22 respectively, guide sliding mechanisms 38 are provided between the hook plate frame 37 and the fixing bracket 26, the hook plate frame 37 is slidably connected to the fixing bracket 26 through the guide sliding mechanism 38, a lower end of the hook plate frame 37 extends toward a center of the sliding sealing sleeve 22 to form the hook plate 39, a front side and a rear side of the upper valve cover 77 of the spiral water intake valve 19 extend outward to form the limit plates 40, limiting wheel holes 42 are provided in the hook plate frame 37 at intervals, the eccentric wheels 41 are fixedly provided at a front end and a rear end of the left gear shaft 28, the eccentric wheels 41 are fixedly provided at a front end and a rear end of the right gear shaft 28, the eccentric wheels 41 are placed in the limiting wheel holes 42, when a top of the eccentric wheel 41 turns from a proximal end to a distal end with respect to the center, the hook plate frame 37 moves upward with the eccentric wheel 41, and an upper end surface of the hook plate 39 abuts a lower end surfaces of the limit plate 40 to realize a position-limited fixed connection between the fixing bracket 26 and the spiral water intake valve 19. In exemplary embodiments, this facilitates starting the worm motor. The worm motor drives the worm shaft, which drives the left gear and the right gear to rotate through the worm gear transmission, thereby driving the eccentric wheel to rotate, such that the hook plate rises under the action of the eccentric wheel while the sliding sealing sleeve moves down. When the sealing ring at the lower end of the sliding sealing sleeve abuts the upper valve cover of the spiral water intake valve, the upper end surface of the hooking plate is abutted against and fixed to the lower end surface of the limit plate, thereby realizing the sealing and fixation of the hook plate and the spiral water intake valve.

In exemplary embodiments of the present application, the valve shaft 2 is provided with a detection hole in an axial direction, the valve shaft 2 is provided with an in-place sensor 8 and an in-place probe rod 9 from top to bottom, the in-place sensor 8 is fixedly connected to an inner wall of the valve shaft 2 in a sealed way, the in-place probe rod 9 is provided below the in-place sensor 8, a baffle ring 10 is fixedly provided on the inner wall of the valve shaft 2 below the in-place sensor 8, the in-place sensor 8 is connected to the control system, an outer diameter of an upper part of the in-place probe rod 9 is less than an outer diameter of a middle part of the in-place probe rod 9, the outer diameter of the middle part of the in-place probe rod 9 is less than an inner diameter of the baffle ring 10, a limit spring 11 is provided between the upper part of the in-place probe rod 9 and the baffle ring 10, the limit spring 11 is fitted over the upper part of the in-place probe rod 9 as a sleeve in a compressed state, an upper end of the in-place probe rod 9 passes through the limit spring 11 and the baffle ring 10 and is placed below the in-place sensor 8, the in-place probe rod 9 is slidably connected to the valve shaft 2, a lower end of the in-place probe rod 9 passes through the valve shaft 2 and is connected to the valve opening wrench 7. After the valve opening wrench 7 is connected to the mating connector 16, the mating connector 16 may drive the in-place probe rod 9 to move upward to be sensed by the in-place sensor 8, thereby realizing an in-place connection.

In exemplary embodiments of the present application, a probe rod hole is provided in a middle of the valve opening wrench 7, the probe rod hole is connected with the detection hole, a joint connecting groove 12 is provided at a lower end of the valve opening wrench 7, the joint connecting groove 12 is matched with and connected to the mating connector 16, an upper end of the joint connecting groove 12 is connected with the probe rod hole, the outer diameter of a lower part of the in-place probe rod 9 is less than the outer diameter of the middle part of the in-place probe rod 9, the probe rod hole is smaller than the outer diameter of the middle part of the in-place probe rod 9, the lower end of the in-place probe rod 9 passes through the probe rod hole and is placed in the joint connecting groove 12 to abut the mating connector 16, so that when the valve opening wrench and the mating connector are connected in place, the mating connector abuts the in-place probe rod to moves it upward until it is sensed by the in-place sensor and connected in place.

In exemplary embodiments of the present application, a driving block 79 is radially fixedly provided at an outer wall of the lower end of the valve opening wrench 7, a baffle block 80 is fixedly provided at the upper end of the main valve sealing stand 116. After the valve opening wrench 7 connected to the mating connector 16, the driving block 79 abuts the baffle block 80, thereby driving the main valve sealing stand 116 to rotate and move up and down, so that the valve opening wrench drives the main valve core to move synchronously through the driving block and the baffle block.

In exemplary embodiments of the present application, the valve opening wrench 7 is a universal sleeve 13, the lower end of the in-place probe rod 9 passes through the valve shaft 2 and is fixedly connected to a core rod of the universal sleeve 13, so that when the universal sleeve is connected to the mating connector, and the mating connector presses the core rod of the universal sleeve upward, so that the core rod drives the in-place probe rod to move upward to be sensed by the in-place sensor, thereby realizing an in-place connection.

In exemplary embodiments of the present application, the lifting and rotating mechanism 6 includes a ball spline pair 47, a bearing, a bearing stand 48, a spline pulley 49, a ball screw pair 50, a transmission connecting rod 51, and a driving mechanism 52. The ball spline pair 47 is provided at the upper end of the valve shaft 2, the upper end of the valve shaft 2 is fixedly connected to a lower end of a spline shaft 53 of the ball spline pair 47, an upper end of the spline shaft 53 is fixedly connected to the bearing stand 48 through a bearing, a spline shaft nut 54 of the ball spline pair 47 is fixedly connected to the fixing stand 1 through a bearing, the spline pulley 49 is fixedly provided on an outer wall of the spline shaft nut 54, the ball screw pair 50 is provided on one side of the bearing stand 48, the bearing stand 48 is fixedly connected to a nut 55 of the ball screw pair 50 through the transmission connecting rod 51, and a screw 56 of the ball screw pair 50 is connected to the fixing stand 1 through a bearing and a bracket, the spline pulley 49 and the screws 56 of the ball screw pair 50 are respectively driven by the driving mechanism 52. In exemplary embodiments, this facilitates the rotation of the screw of the ball screw pair through the driving mechanism. This rotation drives the nut to move up and down, and the nut drives the spline shaft and the valve shaft to move up and down through the transmission connecting rod. The valve shaft drives the valve opening wrench moves down to be connected with the spiral track water valve. The spline pulley is driven to rotate by the driving mechanism, which in turn drives a spline outer cylinder to rotate, realizing the rotation of the spline shaft. The spline shaft drives the valve shaft to rotate, causing the valve opening wrench to drive the main valve sealing stand to rotate so as to realize a spiral switching valve.

In exemplary embodiments of the present application, the driving mechanism 52 may include a ball screw driving motor 57 and a ball spline driving motor 58, the ball screw driving motor 57 and the ball spline driving motor 58 are respectively connected to the control system, the screw 56 of the ball screw pair 50 is driven by the ball screw driving motor 57, the spline pulley 49 is driven by the ball spline driving motor 58 through gear transmission. In exemplary embodiments, this facilitates driving the valve opening wrench to move up and down by the ball screw driving motor and driving the valve shaft to rotate by the ball spline driving motor, causing the valve opening wrench to drive the main valve sealing stand to rotate, thereby realizing a spiral switch valve.

In exemplary embodiments of the present application, the spline pulley 49 is connected to a spline driving pulley 64 through a synchronous belt 63, the spline driving pulley 64 is fixed on a spline driving pulley shaft 65, a bidirectional torque limiter 68 is mounted on the spline driving pulley shaft 65, and the bidirectional torque limiter 68 is connected to the control system. In exemplary embodiments, this prevents overloading of the ball spline driving motor.

In exemplary embodiments of the present application, the driving mechanism 52 may also include a main driving motor 59, a first driving gear 60, a clutch 67, a second driving gear 61, a first driven gear 62, a synchronous belt 63, a spline driving pulley 64, a spline driving pulley shaft 65, and the second driven gear 66, the main driving motor 59 is provided on one side of the fixing stand 1, the main driving motor 59 is connected to the control system, the main driving motor 59 is connected to the fixing stand 1 through a bracket, the first driving gear 60 and the clutch 67 are separated from each other and provided on an output shaft of the main driving motor 59, the first driving gear 60 is fixedly connected to the output shaft of the main driving motor 59, the first driving gear 60 engages with the first driven gear 62, the first driven gear 62 is fixedly connected to the screw 56 of the ball screw pair 50, the clutch 67 is fixedly connected to the output shaft of the main driving motor 59, the clutch 67 is connected to the control system, the second driving gear 61 is fixed on an output shaft of the clutch 67, the spline pulley 49 is connected to the spline driving pulley 64 through the synchronous belt 63, the spline driving pulley 64 is fixed on the spline driving pulley shaft 65, a second driven gear 66 is provided at a lower end of the spline driving pulley shaft 65, the second driven gear 66 is fixedly connected to the spline driving pulley shaft 65, and the second driven gear 66 engages with the second driving gear 61. In exemplary embodiments, this facilitates the main driving motor to drive the screw of the ball screw pair and the spline pulley to rotate. When the valve shaft does not need to rotate, disconnection can be realized by actuating the clutch to stop the spline driving pulley shaft from rotating.

In exemplary embodiments of the present application, a sealing plate 69 is provided at a lower end of the valve shaft hole 5, and the valve shaft 2 is connected with the sealing plate 69 in a sealed way. In exemplary embodiments, this prevents water flow from entering between the valve shaft hole and the valve shaft.

In exemplary embodiments of the present application, the screw 56 of the ball screw pair 50 is fixedly connected to a bracket through a bearing and a screw bearing stand 70, the bracket is fixedly connected to the fixing stand 1, a valve closing sensor 71 is provided on the screw bearing stand 70 at an upper end of the screw 56, the valve closing sensor 71 is connected to the control system, a sensing block is fixedly provided on the transmission connecting rod 51, and the sensing block cooperates with the valve closing sensor 71, such that when the screw rises and the valve shaft returns in place, the sensing block contacts the valve closing sensor, such that the valve closing sensor senses the sensing block to confirm that the valve is closed in place.

In exemplary embodiments of the present application, limit baffles 95 are respectively provided on a front side and a rear side of a lower end of the limiting wheel hole 42, the limiting baffles 95 are fixedly connected to the hook plate frame 37, a lubricating oil groove is formed between two limiting baffles 95 and the limiting wheel hole 42, lubricating oil is provided in the lubricating oil groove, when the eccentric wheel 41 rotates, the eccentric wheel 41 comes into contact with the lubricating oil in the lubricating oil groove. In exemplary embodiments, this improves the smoothness of the rotation of the eccentric wheel through the lubricating oil.

In exemplary embodiments of the present application, at least one pressing mechanism 43 is provided at an upper end of the hook plate frame 37, the pressing mechanism 43 includes an upper connecting stand 44, a lower connecting stand 45, and a spring 46, at least one lower connecting stand 45 is provided on the hook plate frame 37, the lower connecting stand 45 is fixedly connected to the hook plate frame 37, at least one spring 46 is provided on the lower connecting stand 45, the upper connecting stand 44 is provided on the fixing bracket 26, the upper connecting stand 44 is fixedly connected to the hook plate frame 37, the upper connecting stand 44 is opposite to the lower connecting stand 45, the spring 46 is in a compressed state, one end of the spring 46 is fixedly connected to the upper connecting stand 44, and the other end of the spring 46 is fixedly connected to the lower connecting stand 45. In exemplary embodiments, when the eccentric wheel drives the hook plate to move downward, the spring expands due to compression to push the hook plate frame downward to separate the hook plate from the limit plate.

In exemplary embodiments of the present application, the upper connecting stand 44 is provided with at least one upper spring groove opening downward, the lower connecting stand 45 is provided with at least one lower spring groove opening upward, one end of the spring 46 is placed in the upper spring groove and is fixedly connected to the upper spring groove, and the other end of the spring 46 is placed in the lower spring groove and fixedly connected to the lower spring groove. In exemplary embodiments, this facilitates guiding the spring through the upper and lower spring grooves to prevent the spring from skewing.

In exemplary embodiments of the present application, the guide sliding mechanism 38 includes first sliding bars 97 and a sliding limit block 98, the sliding limit block 98 is provided at a middle part of the fixing bracket 26, a guide groove 94 is provided at a middle part of the hook plate frame 37, the first sliding bars 97 are respectively fixedly provided on a left side and a right side of an inner wall of the guide groove 94, the sliding limit block 98 is placed in the guide groove 94 and is slidably connected to the guide groove 94 through the first sliding bars 97, and the sliding limit block 98 is fixedly connected to the fixing bracket 26. In exemplary embodiments, this facilitates limiting the position of the hook plate frame through the sliding limiter block and preventing the hook plate frame from moving left and right through the guide groove, the sliding limiter block, and the first sliding bars.

In exemplary embodiments of the present application, the guide sliding mechanism 38 also includes a front and rear limit sliding mechanism 96, the front and rear limit sliding mechanism 96 includes second sliding bars 99 and sliding limit stands 101, the sliding limit stands 101 are provided at both ends of the fixing bracket 26, the sliding limit stands 101 are fixedly connected to the fixing bracket 26, an open limiting groove facing toward the hook plate frame 37 is provided between the sliding limiting stand 101 and the fixing bracket 26, second sliding bars 99 are fixedly provided on a front side and a rear side of the open limiting groove respectively, a left end and a right end of the hook plate frame 37 are respectively placed in the open limiting grooves and are slidably connected to the open limiting grooves through the second sliding bars 99. In exemplary embodiments, this facilitates limits the hook plate frame from moving forward and backward with the sliding limit stands, so that the hook plate frame cannot move forward and backward.

In exemplary embodiments of the present application, a positioning mechanism 75 is provided between the spiral water intake valve 19 and the valve opening mechanism 100, the positioning mechanism 75 includes positioning blocks 76 and a positioning proximity sensor 78, the positioning blocks 76 are respectively provided at a left end and a right end of the upper valve cover 77 of the spiral water intake valve 19, the positioning blocks 76 are fixedly connected to the upper valve cover 77, the positioning proximity sensor 78 is provided on the base frame 21 above the positioning blocks 76, the positioning proximity sensor 78 cooperates with the positioning blocks 76, the positioning proximity sensor 78 is fixedly connected to the base frame 21, and the positioning proximity sensor 78 is connected to the control system, so that when the base frame approaches the spiral water intake valve from one side of the spiral water intake valve, the positioning block on the left or right side of the spiral water intake valve is sensed by the positioning proximity sensor on the base frame, and the base frame begins to slow down. As the base frame moves, when the positioning block on the right or left side of the spiral water intake valve is sensed by the positioning proximity sensor on the base frame, the base frame stops.

In exemplary embodiments of the present application, an upper end surface of the upper valve cover 77 is provided with a sealing groove, a lower end of the sealing ring 23 is embedded in the sealing groove to connect the sliding sealing sleeve 22 with the spiral water intake valve 19 in a sealed way. In exemplary embodiments, this facilitates the fixation and position limitation of the sealing ring in the sealing groove, thereby increasing the stability of the connection.

In exemplary embodiments of the present application, a video intercom device 72 and a flame detector 73 are fixedly provided on the base frame 21, and the video intercom device 72 and the flame detector 73 are respectively connected to the control system. In exemplary embodiments, this facilitates early detection of the fire source.

In exemplary embodiments of the present application, a protective cover 74 is fixedly provided on an outside of the base frame 21. In exemplary embodiments, this protects various components on the base frame.

Figure 2:
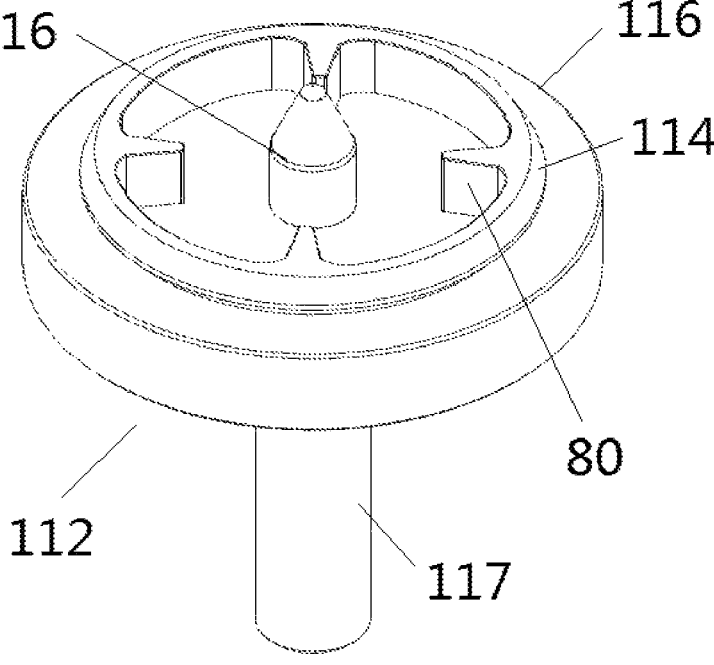
FIG. 2 is an enlarged schematic view of a main valve core in FIG. 1 in exemplary embodiments of the present application.
Figure 3:
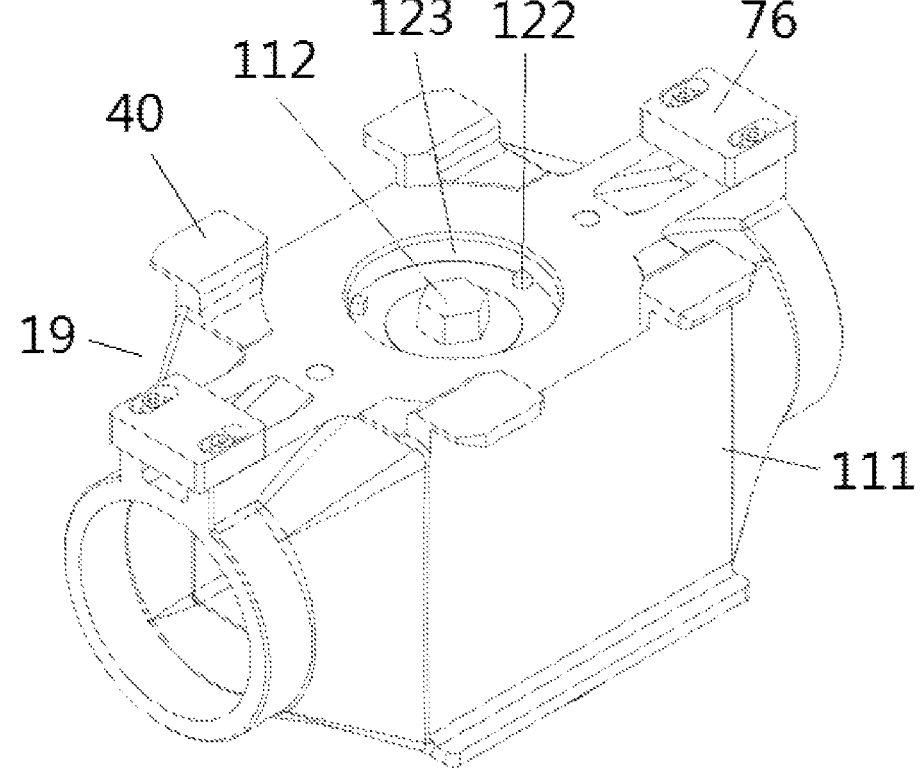
FIG. 3 is another schematic structural diagram of a spiral water intake valve in exemplary embodiments of the present application.
Figure 4:
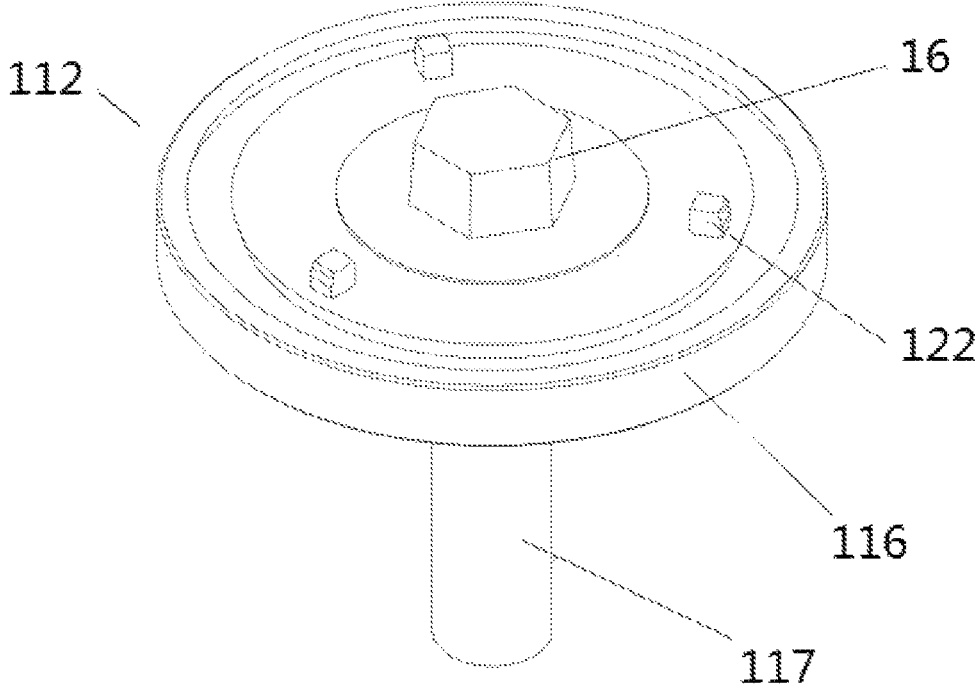
FIG. 4 is an enlarged schematic view of a main valve core in FIG. 3 in exemplary embodiments of the present application.
Figure 5:
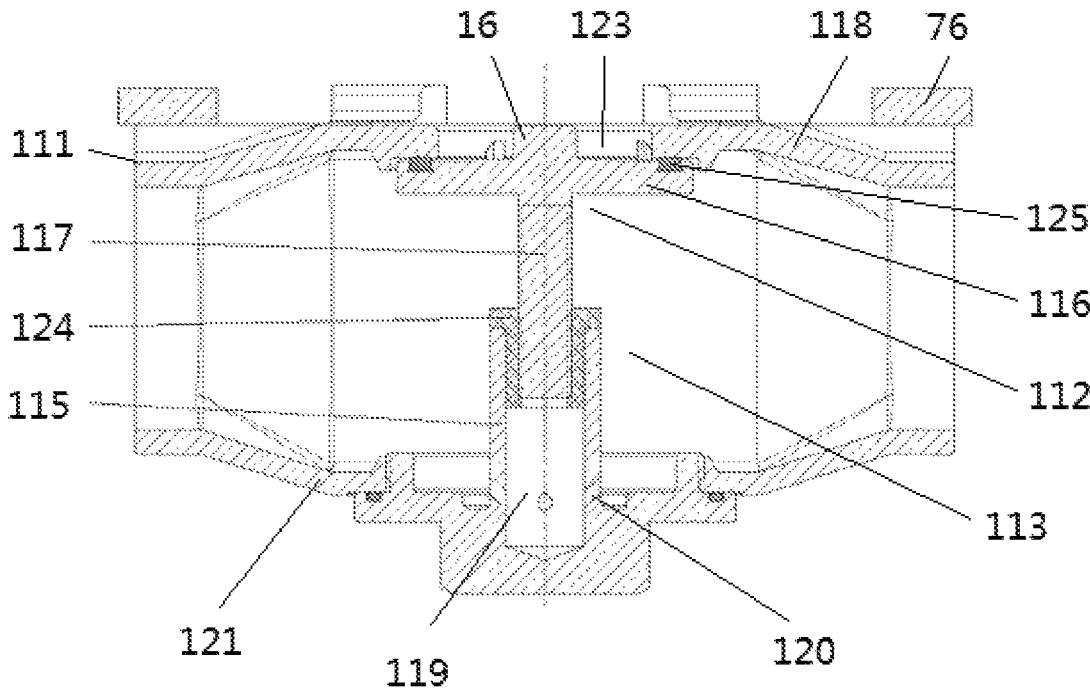
FIG. 5 is a cross-sectional view of FIG. 3 in exemplary embodiments of the present application.
Figure 6:
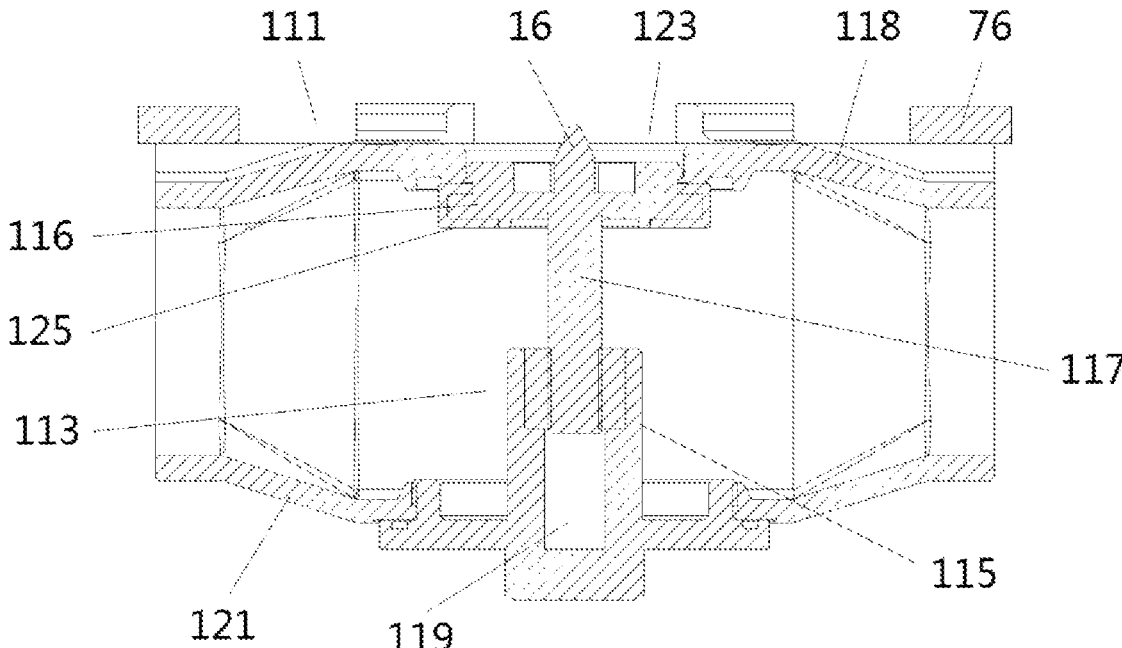
FIG. 6 is another schematic structural diagram of a spiral water intake valve in exemplary embodiments of the present application.
Figure 7:
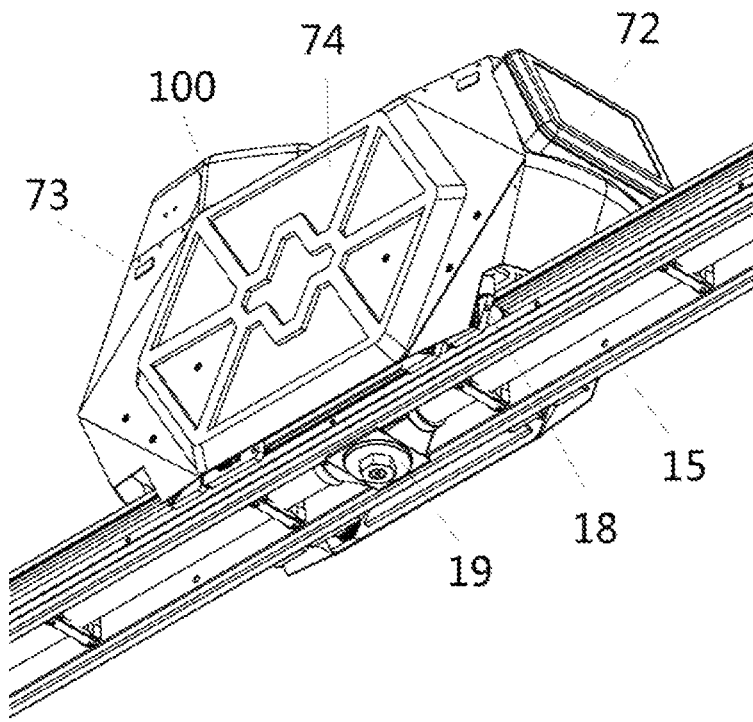
FIG. 7 is a schematic structural diagram of a fire-fighting robot in exemplary embodiments of the present application.

As shown in FIG. 1 to FIG. 26, in the present application, as to the spiral water intake valve, the valve body has a water flow channel. The water flow channel is connected with the water flow in the track. A water intake channel is provided in the middle of the upper valve cover of the valve body. When the main valve sealing stand is separated from the upper valve cover, the water flow channel and the water intake channel are connected to realize water intake. In the present application, the mating connector has a tapered or polygonal shape. The tapered shape may be conical or non-conical. According to the shape of the mating connector, the mating connector may be divided into three types of structures: the first type is that the mating connector is conical, as shown in FIG. 1, FIG. 2, and FIG. 12; the second type is that the mating connector is non-conical, in exemplary embodiments, as shown in FIGS. 13-16, the mating connector has a pentagonal tapered shape; and the third type is that the mating connector has a polygonal shape, as shown in FIG. 3 to FIG. 5. In the spiral water intake valve of the present application, there are two types of structures of the sealing gasket between the main valve sealing stand and the upper valve cover. The first type is shown in FIG. 5, in which the upper end of the main valve sealing stand is provided with a sealing gasket, the sealing gasket is annular, a sealing groove is provided on the upper end of the main valve sealing stand to receive the sealing gasket, and the main valve sealing stand is connected to the lower end of the upper valve cover through the sealing gasket in a compressed and sealed way. This sealing method is not limited by height, and the sealing can be achieved by making the main valve sealing stand rise to contact with the upper valve cover. The other type is shown in FIG. 6, in which the sealing gasket is in the shape of a sleeve, and the sealing gasket wraps the main valve sealing stand from top to bottom. The sealing gasket can be fixed on the main valve sealing stand using the vulcanization process in the conventional technique, or can be pressed to be fixed on the main valve sealing stand through bolts and fixing plates, which can be selected as needed. This shape of sealing gasket greatly improves the sealing performance between the main valve sealing stand and the upper valve cover, and the sealing gasket is not easy to move or fall. The contact area between the sealing gasket and the main valve sealing stand is relatively small, and the friction is also small. The above-mentioned sealing methods can be selected as needed. The shape of the mating connectors used for the two sealing methods is not limited.

FIG. 22 to FIG. 26 show valve opening mechanisms according to exemplary embodiments of the present application. For the driving mechanism of the valve opening mechanism, there are two types. In a first type shown in FIG. 22 to FIG. 23, the ball screw driving motor is used to drive the ball screw pair so as to drive the valve shaft to move up and down, the ball spline driving motor is used to drive the ball spline pair to drive the valve shaft to rotate, the bidirectional torque limiter can be installed on the ball spline driving motor to protect the ball spline driving motor, and the bidirectional torque limiter and ball spline driving motor, and the ball screw driving motor are respectively connected to the control system, such as a PLC control system. In a second type shown in FIG. 24 and FIG. 25, the ball screw pair and the ball spline pair are both driven by the main driving motor through gear linkage, the clutch is used to control whether the ball spline pair is used, and the main driving motor and the clutch are controlled by the control system respectively. These two driving types can be set as needed. In the present application, the in-place sensor is connected to the control system.

Figure 10:
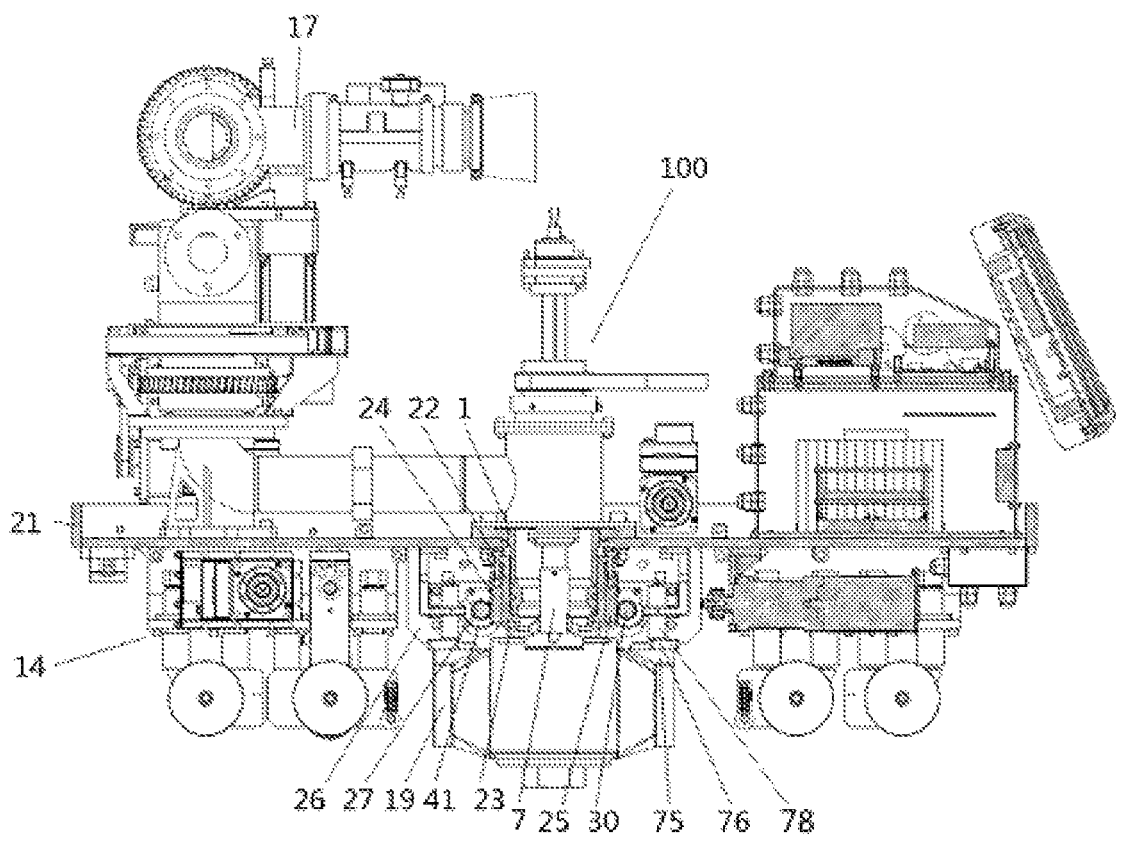
FIG. 10 is a cross-sectional view of a fire-fighting robot in exemplary embodiments of the present application from an angle.
Figure 26:
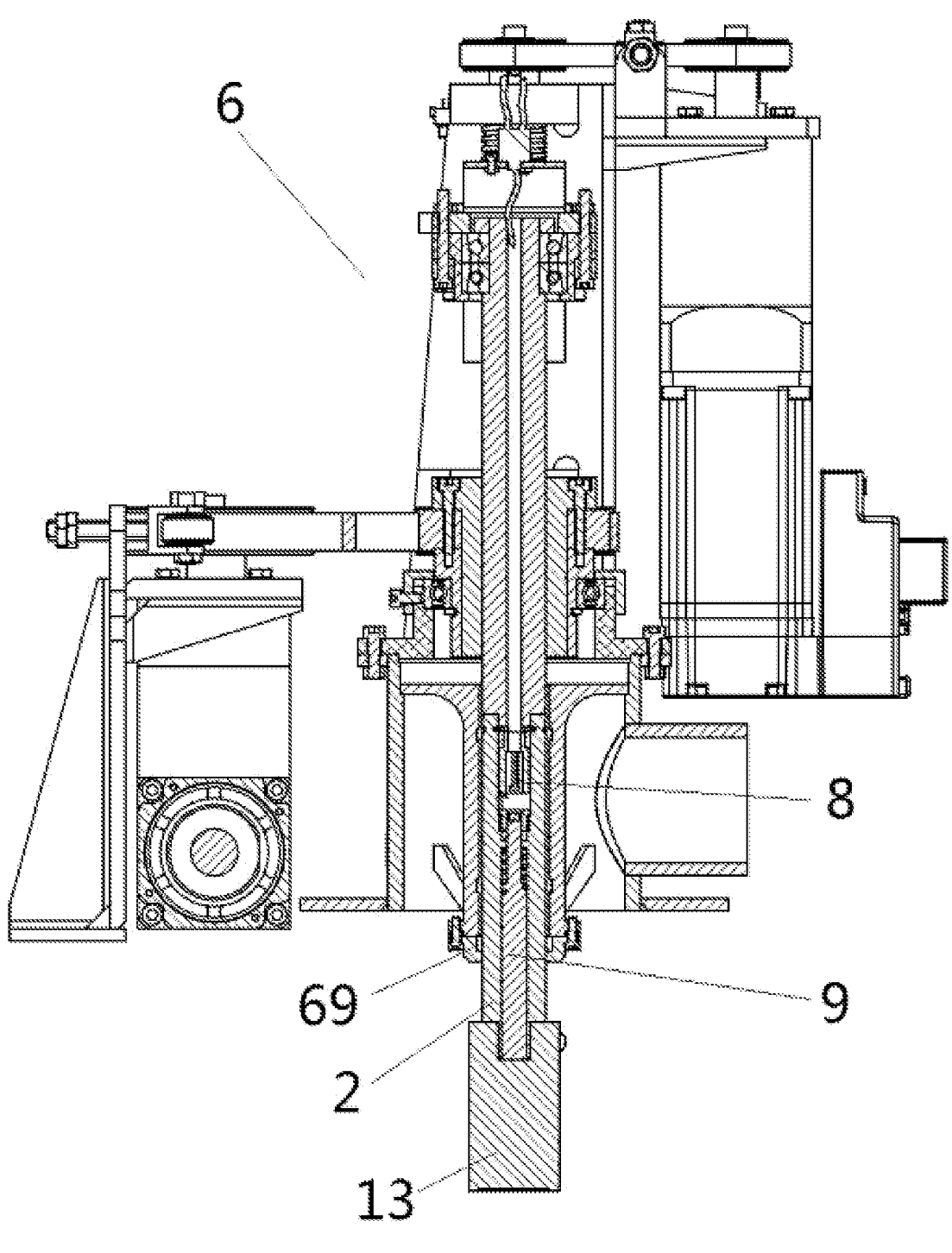
FIG. 26 is a schematic diagram of a structure of a valve opening mechanism in exemplary embodiments of the present application in which the valve opening wrench is a universal sleeve.

In the present application, three types of valve opening wrench structures are provided according to the shape of the mating connector. The valve opening wrench can cooperate with the mating connector to drive the main valve core to rotate and move up and down. In the first type of the valve opening wrench structure, as shown in FIG. 10 and FIG. 12, the lower end of the valve opening wrench is provided with a joint connecting groove, the joint connecting groove is conical, the inner diameter of the upper end of the joint connecting groove is smaller than the lower end of the joint connecting groove, and the outer wall of the valve opening wrench is provided with driving blocks at intervals. This type of valve opening wrench corresponds to the first type of mating connector, that is, the mating connector is conical. Because the joint connecting groove of the valve opening wrench is conical, and the mating connector is also conical, the valve opening wrench can rotate relative to the mating connector, as shown in FIG. 1, FIG. 2, and FIG. 12, the baffle blocks are set outside the mating connector at intervals, and the baffle blocks are fixed on the main valve sealing stand. When the valve core is inserted into the joint connecting groove, the valve opening wrench can be rotated. The valve opening wrench rotates relative to the joint connecting joint, causing the driving blocks to abut the baffle blocks, thereby driving the baffle blocks to drive the main valve sealing stand to rotate and move. This type of structure makes connection convenient, fast, and highly accurate. In the second type of valve opening wrench structure, the lower end of the valve opening wrench is provided with a joint connecting groove, and the joint connecting groove is not conical but can be pyramidal or polygonal, which corresponds to the second type of mating connector and the third type of mating connector, the shape of the joint connecting groove matches the shape of the mating connector. In exemplary embodiments, as shown in FIG. 23, and FIG. 13 to FIG. 16, the joint connecting groove is in the shape of a pentagonal pyramid, and the inner diameter of the upper end of the joint connecting groove is less than the inner diameter of the lower end of the joint connecting groove. Correspondingly, as shown in FIG. 13, the mating connector of the spiral water intake valve is also in the shape of a pentagonal pyramid, which matches the joint connecting groove and is inserted into the joint connecting groove for position limiting, such that the mating connector takes the valve opening wrench to rotate and move up and down together. In the above two types of structures, after the mating connector enters the joint connecting groove, the upper end of the mating connector will contact and push up the in-place probe rod. The in-place probe rod rises and compresses the spring such that the upper end of the in-place probe rod is sensed by the in-place sensor and a signal is transmitted to the control system to achieve an in-place connection. In the third type of valve opening wrench structure, as shown in FIG. 26, the valve opening wrench is a universal sleeve. The universal sleeve can be used with the mating connector of the spiral water intake valve with different angles and shapes. The shape of the mating connector is not limited, as long as the mating connector can be inserted into the universal sleeve and fixed by the universal sleeve and the mating connector can push up the core rod of the universal sleeve. The alignment is accurate and fast and can be completed in one go. The mating connector enters the universal sleeve and pushes the core rod of the universal sleeve to move upward, the core rod drives the in-place probe rod to move upward, the in-place probe rod rises and compresses the spring, the upper end of the in-place probe rod is sensed by the in-place sensor, and a signal is transmitted to the control system, so as to achieve an in-place connection. The three types of valve opening wrenches can be selected and set according to needs.

Figure 8:
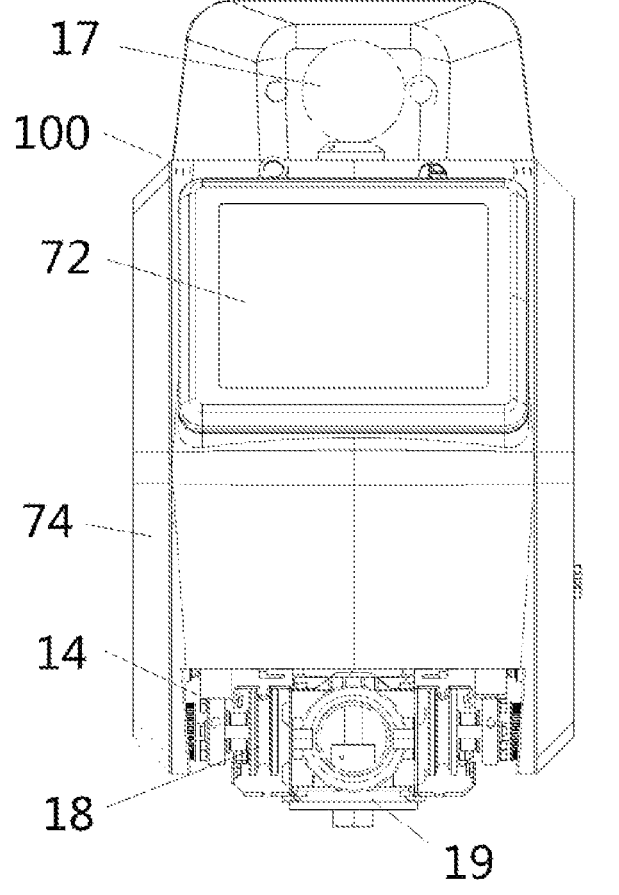
FIG. 8 is a side view of FIG. 7 in exemplary embodiments of the present application with a track removed.
Figure 9:
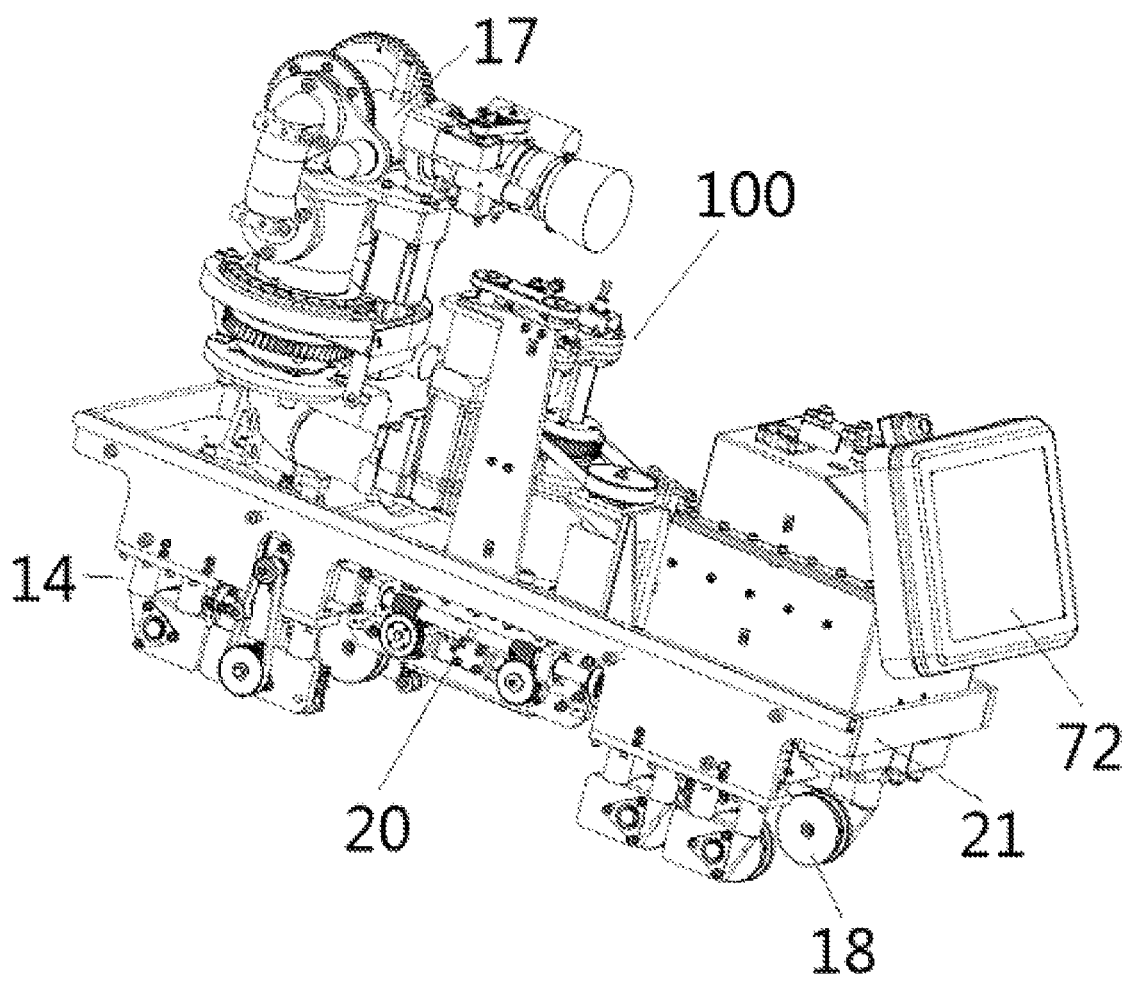
FIG. 9 is a schematic structural diagram of the fire-fighting robot in the present application with a protective cover and a spiral water intake valve removed.
Figure 11:
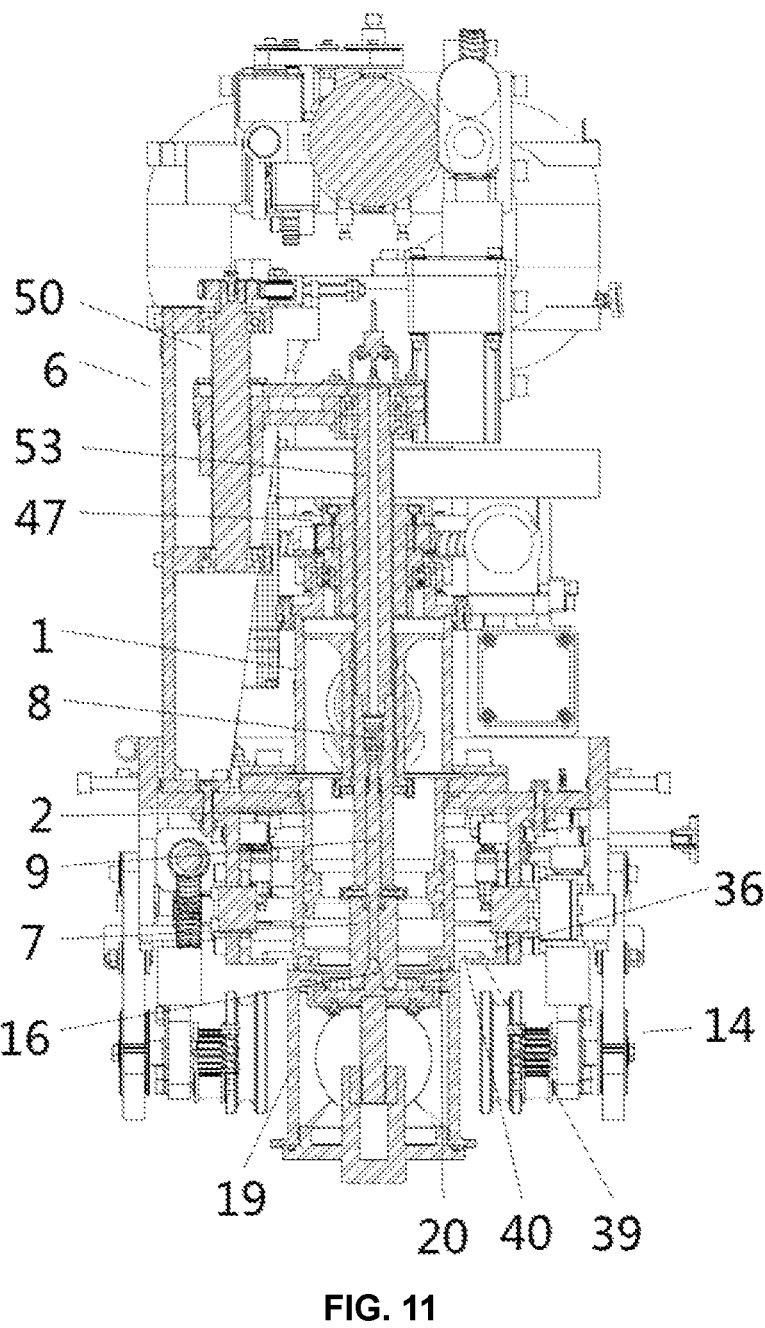
FIG. 11 is a cross-sectional view of a fire-fighting robot in exemplary embodiments of the present application from another angle.
Figure 12:
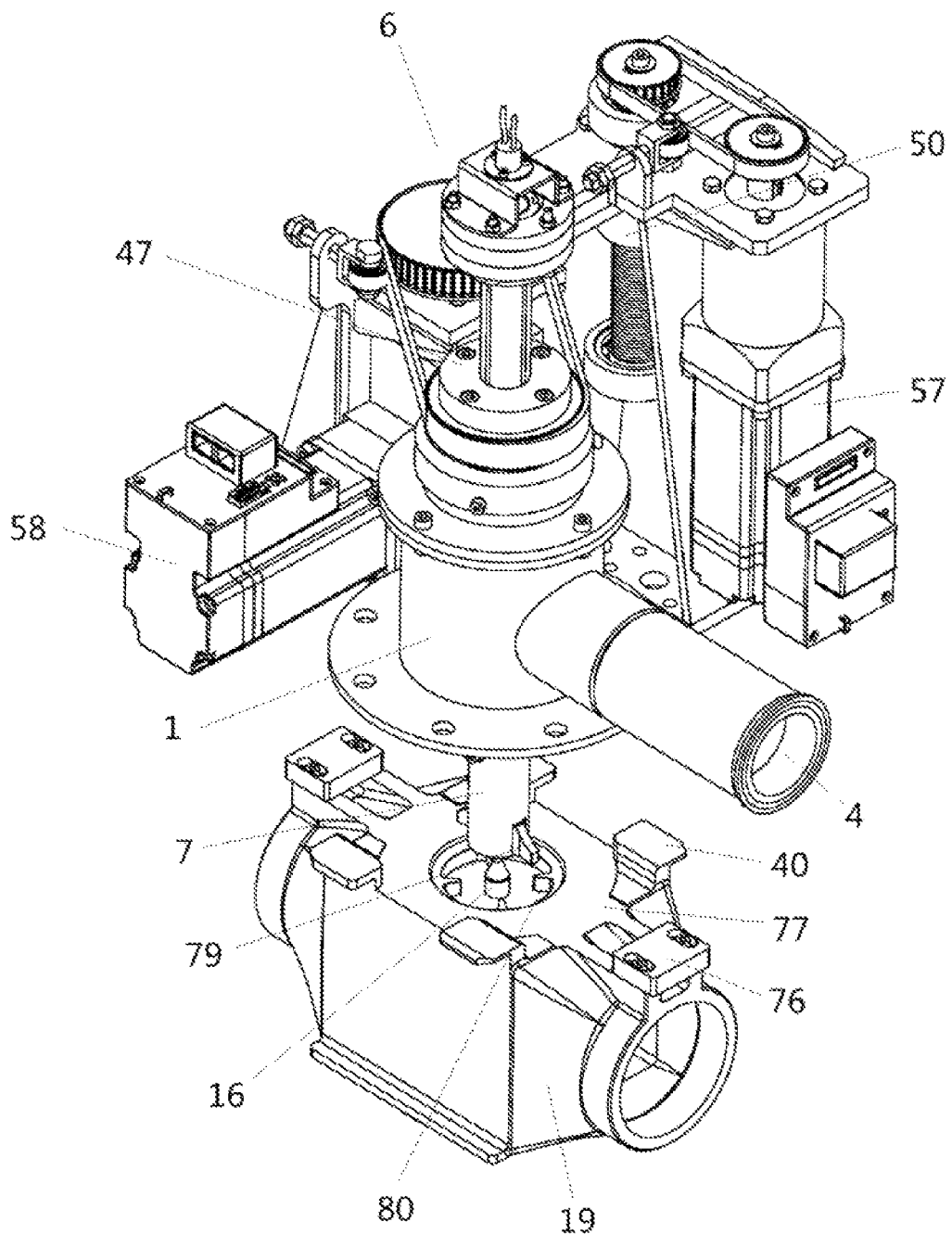
FIG. 12 is a schematic structural diagram of a valve opening wrench, a mating connector, and a main valve core in a fire-fighting robot in exemplary embodiments of the present application.
Figure 13:
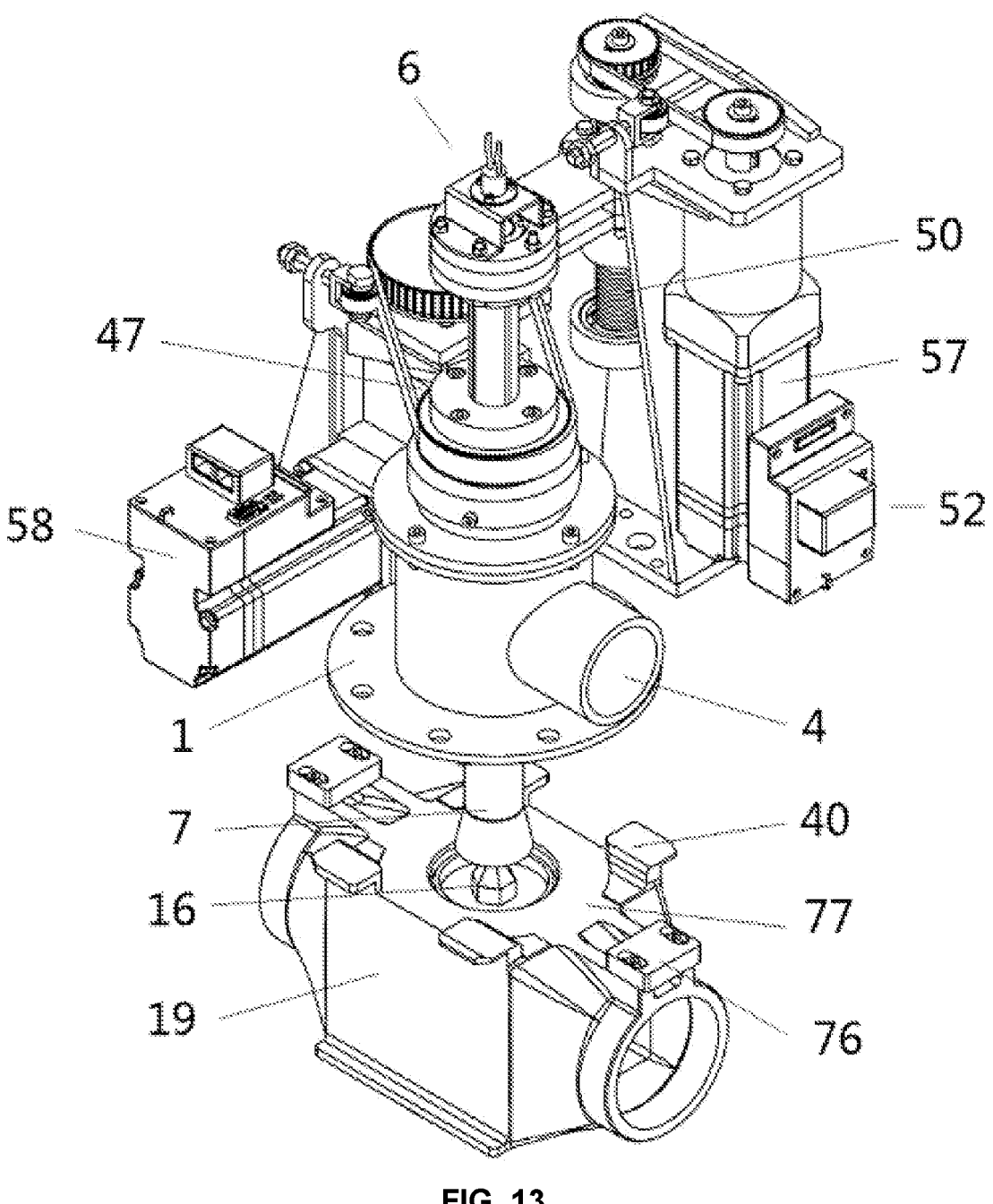
FIG. 13 is a schematic structural diagram of another valve opening wrench, another mating connector, and another main valve core in a fire-fighting robot in exemplary embodiments of the present application.
Figure 14:
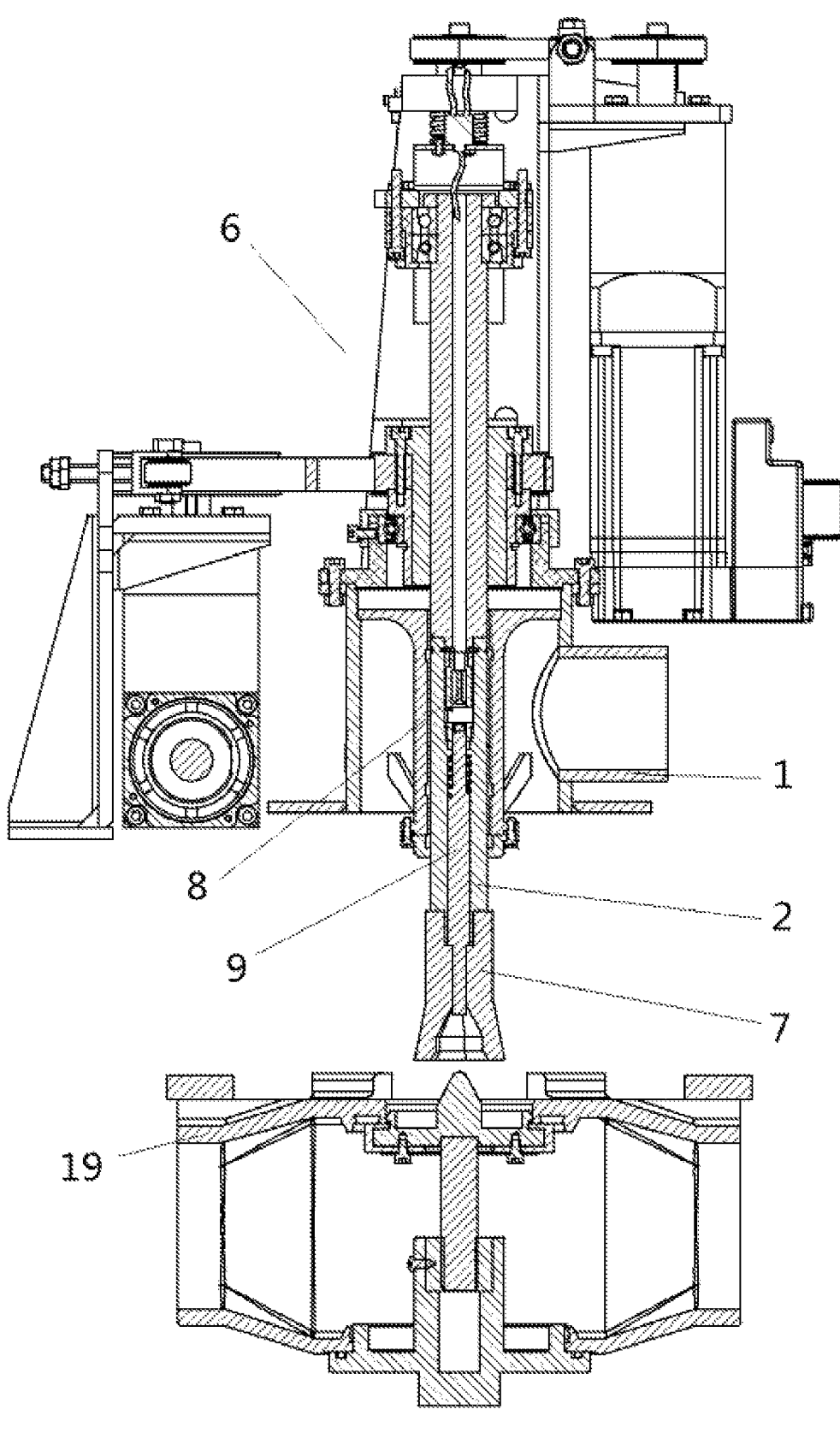
FIG. 14 is a cross-sectional view of FIG. 13 in exemplary embodiments of the present application.
Figure 15:
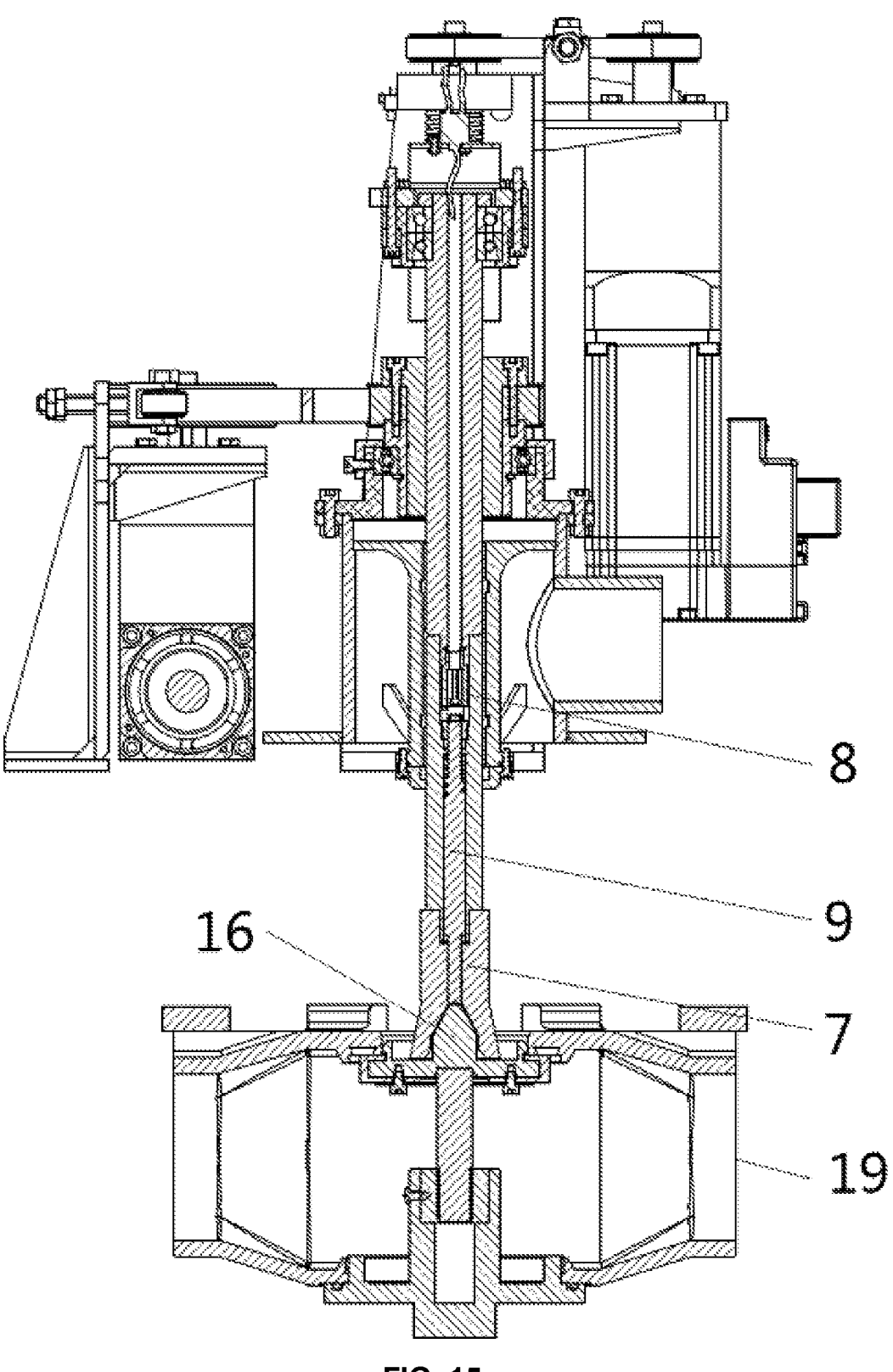
FIG. 15 is a schematic structural diagram in which a valve opening mechanism is connected with a spiral water intake valve in exemplary embodiments of the present application.
Figure 16:
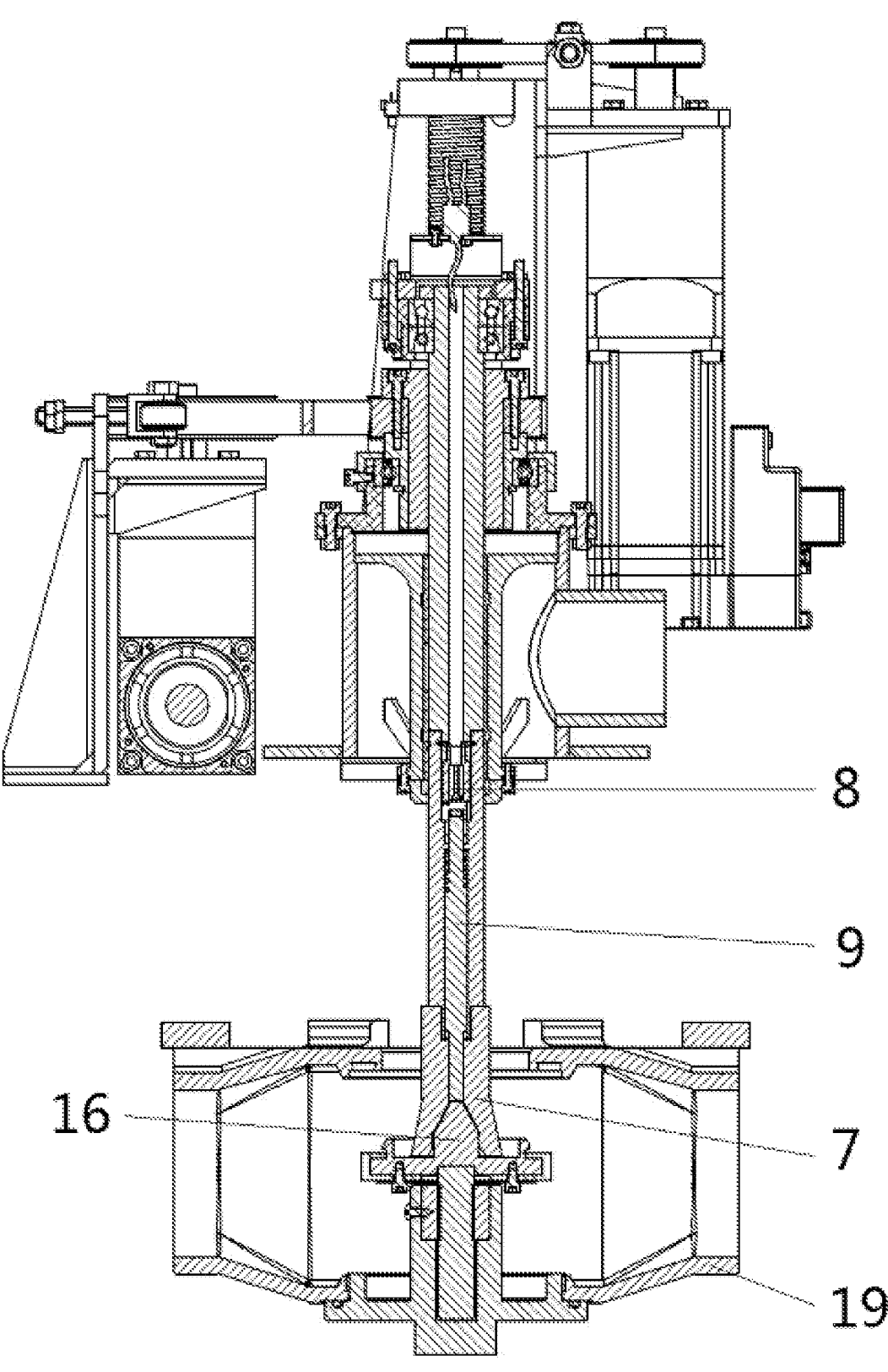
FIG. 16 is a schematic diagram of a state in which the valve opening mechanism is connected to a spiral water intake valve and opens the spiral water intake valve in exemplary embodiments of the present application.
Figure 17:
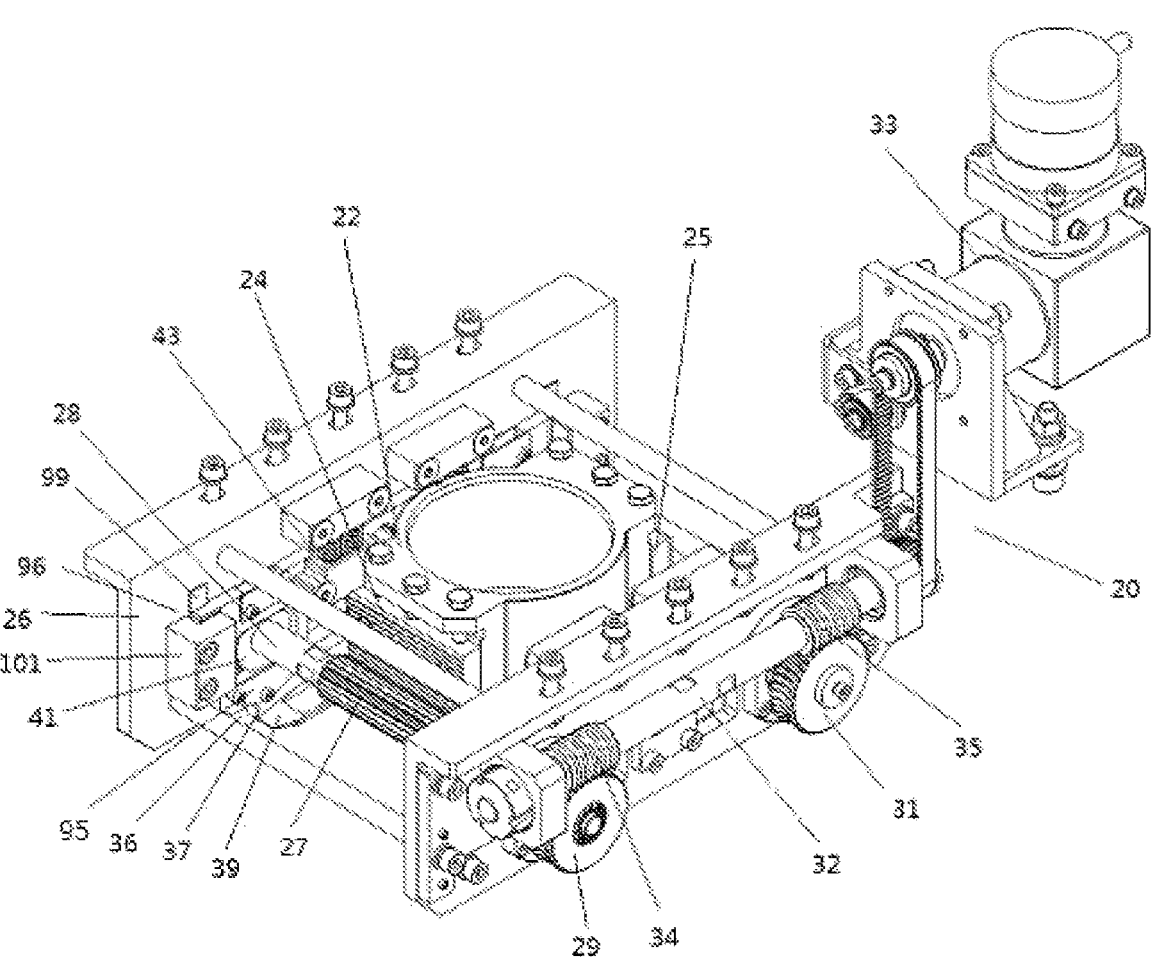
FIG. 17 is a schematic structural diagram of a sealing connection mechanism in exemplary embodiments of the present application.
Figure 18:
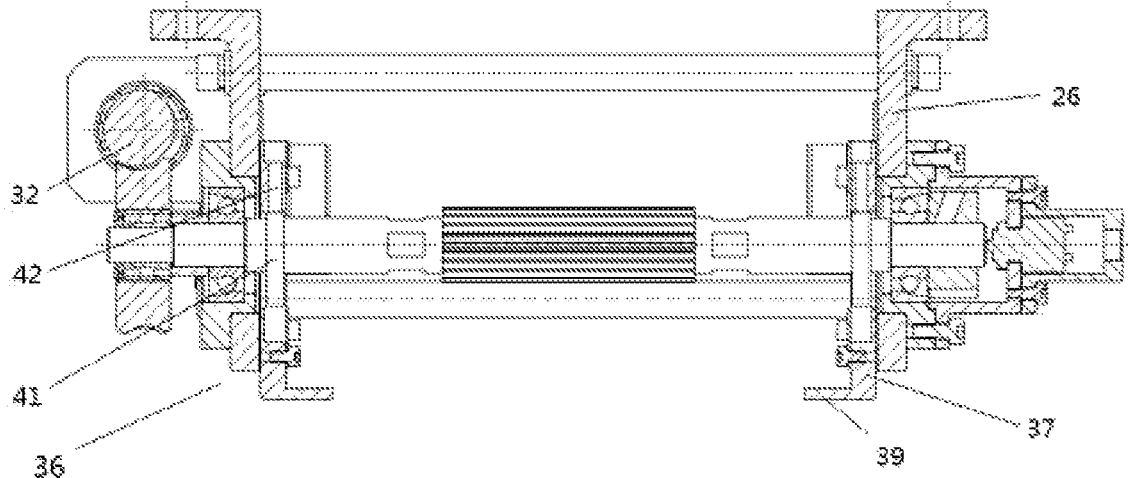
FIG. 18 is a cross-sectional view of FIG. 17 in exemplary embodiments of the present application.
Figure 19:
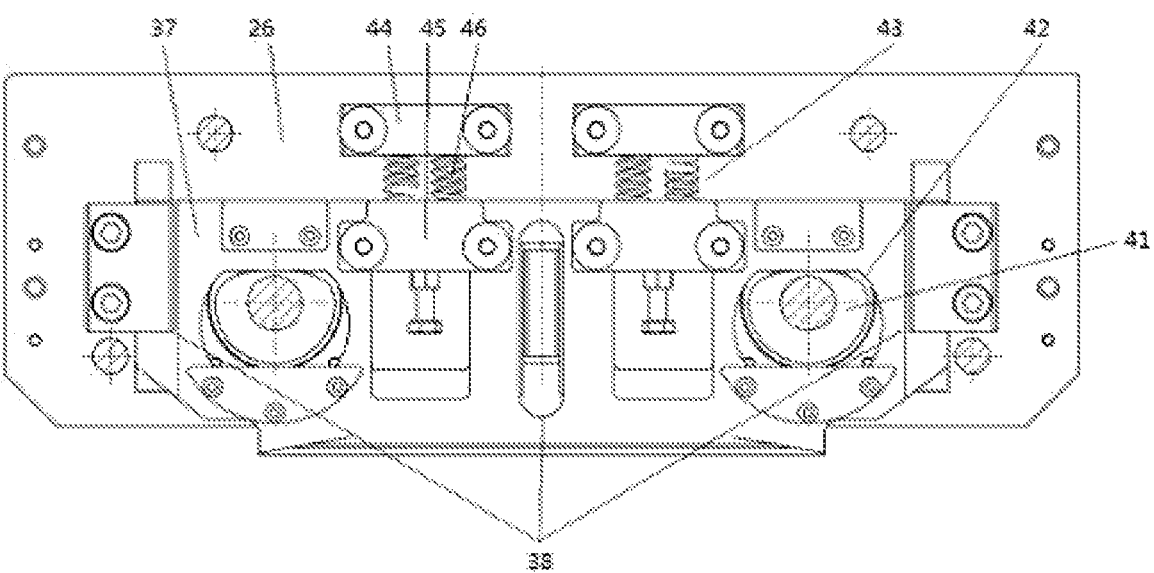
FIG. 19 is a schematic diagram of a state in which a hook plate and a limit plate in a limiting and fixing mechanism are spaced apart and opposed to each other in exemplary embodiments of the present application.
Figure 20:
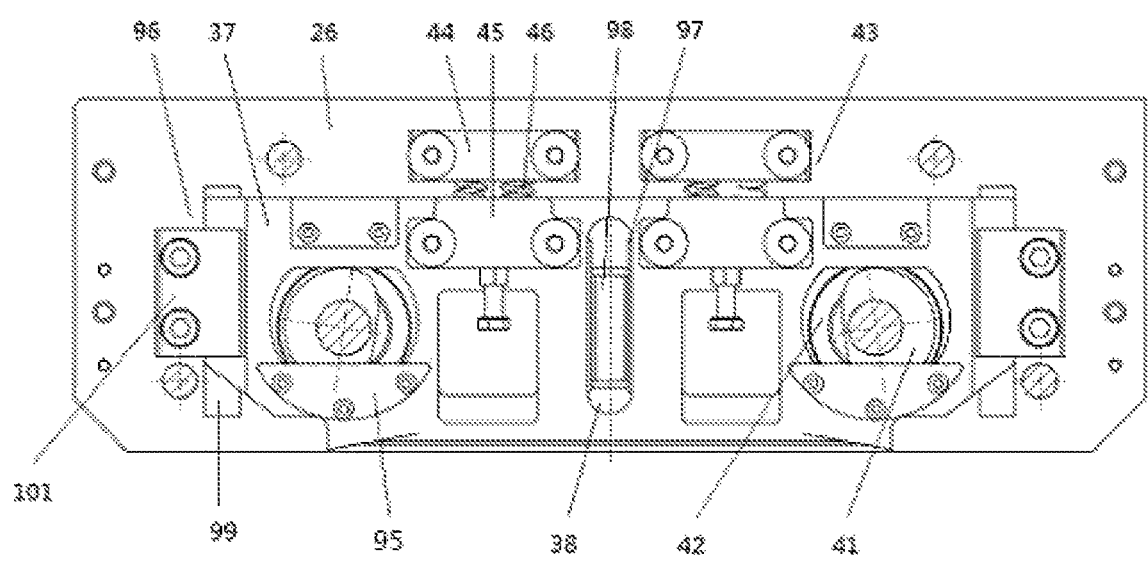
FIG. 20 is a schematic diagram of a state in which a hook plate and a limit plate of a limiting and fixing mechanism are abutted against each other in exemplary embodiments of the present application.
Figure 21:
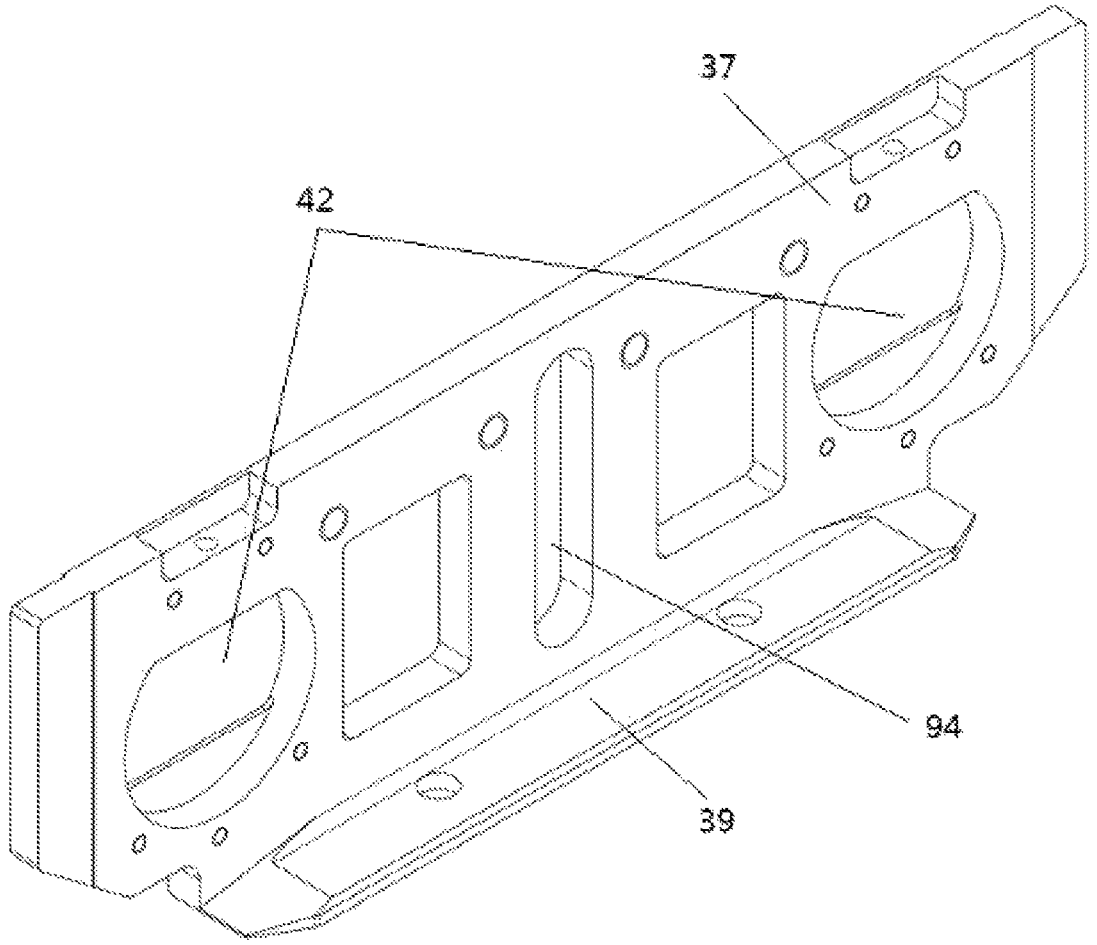
FIG. 21 is a schematic structural diagram of a hook plate frame in exemplary embodiments of the present application.
Figure 22:
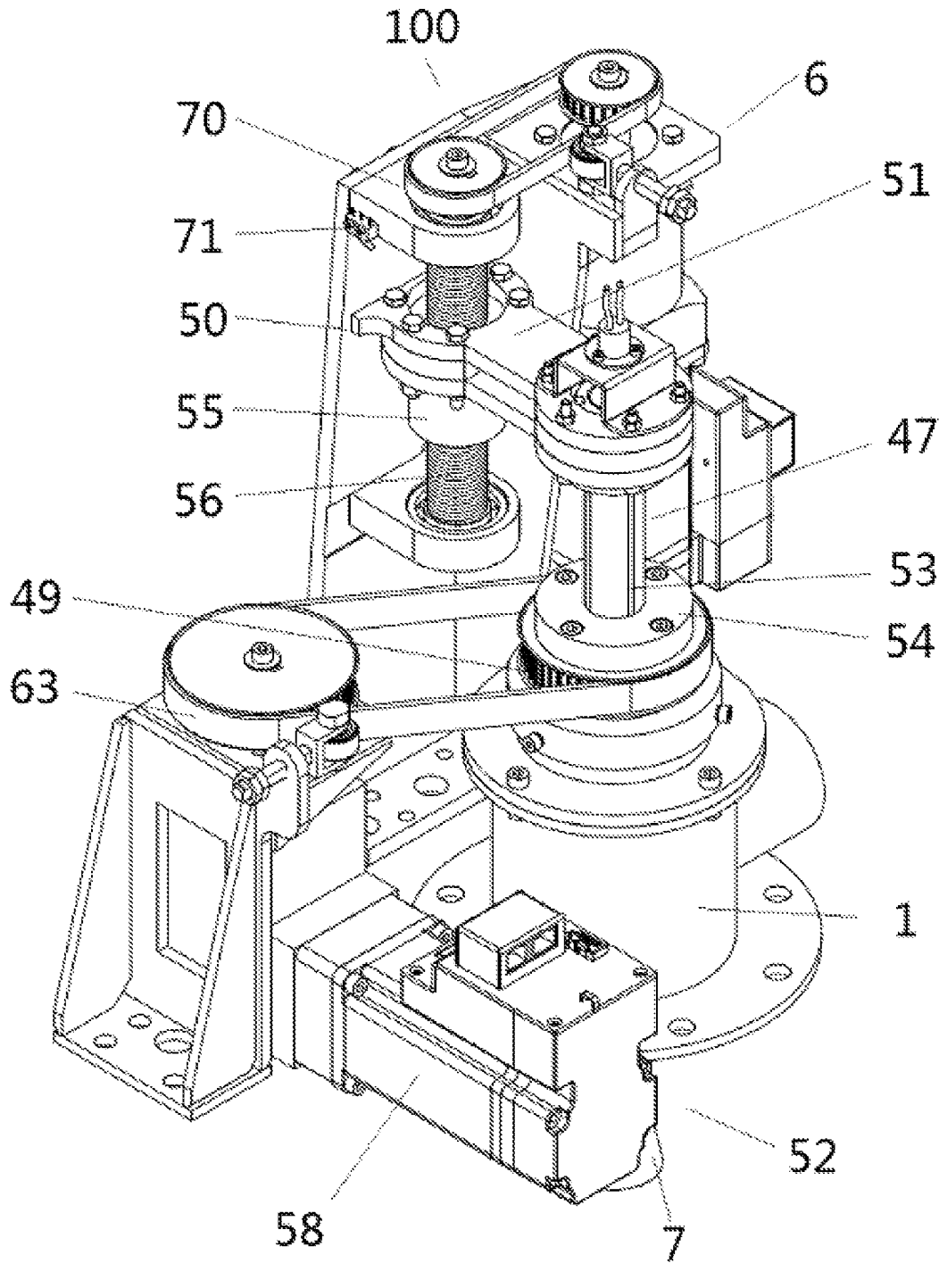
FIG. 22 is a schematic structural diagram of a valve opening mechanism in exemplary embodiments of the present application.
Figure 23:
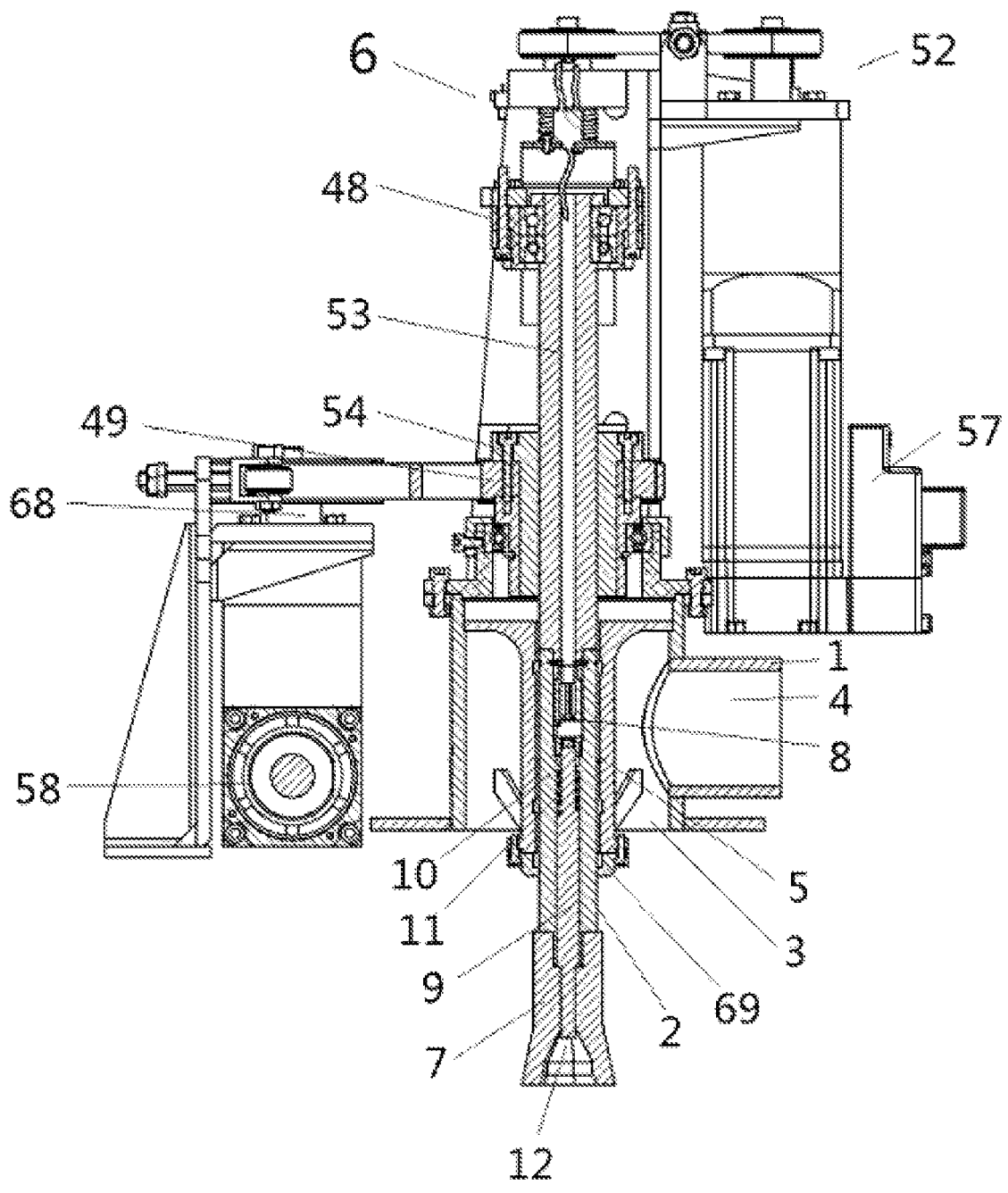
FIG. 23 is a cross-sectional view of FIG. 22 in exemplary embodiments of the present application.
Figure 24:
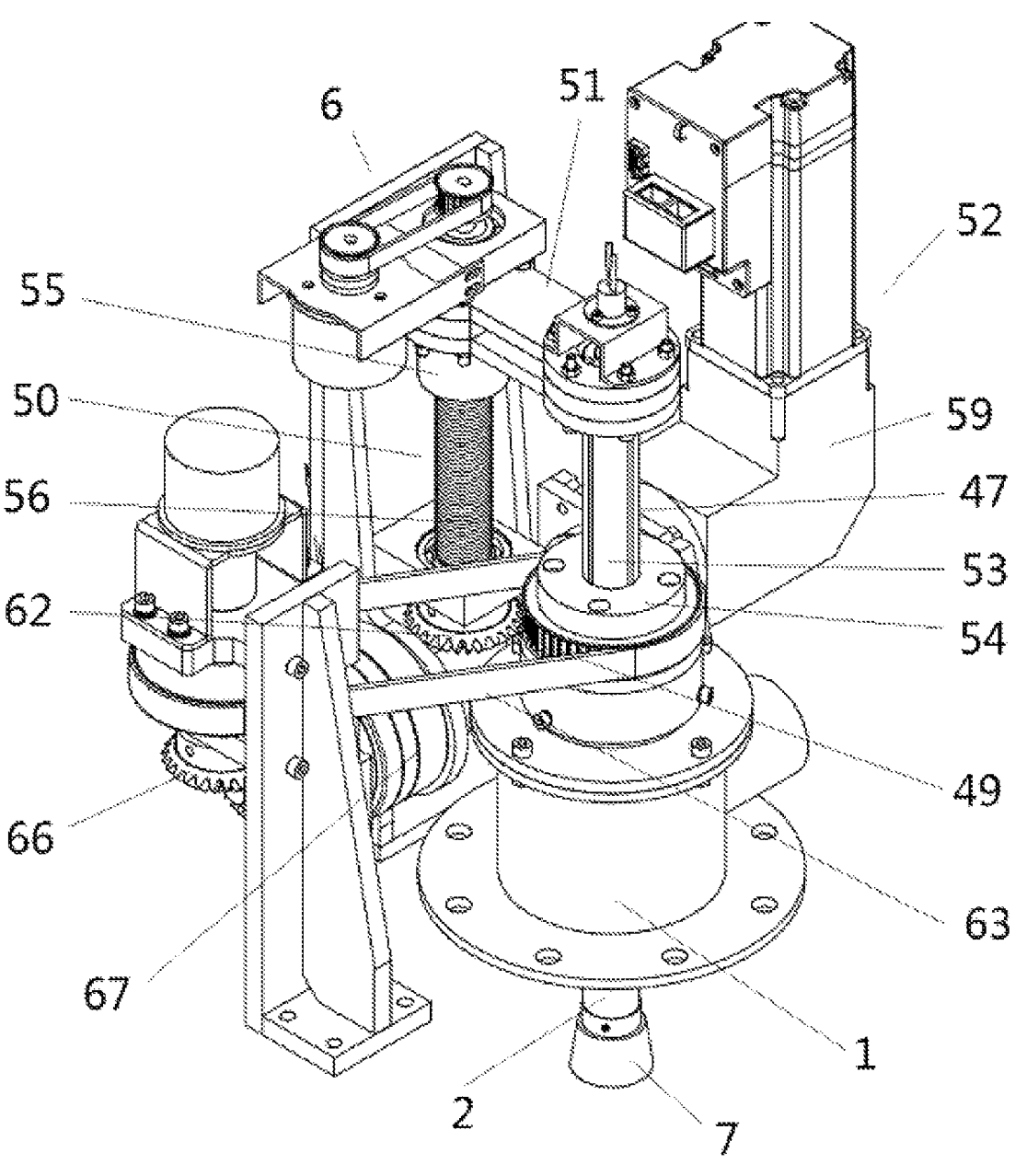
FIG. 24 is another schematic diagram of a valve opening mechanism in exemplary embodiments of the present application.
Figure 25:
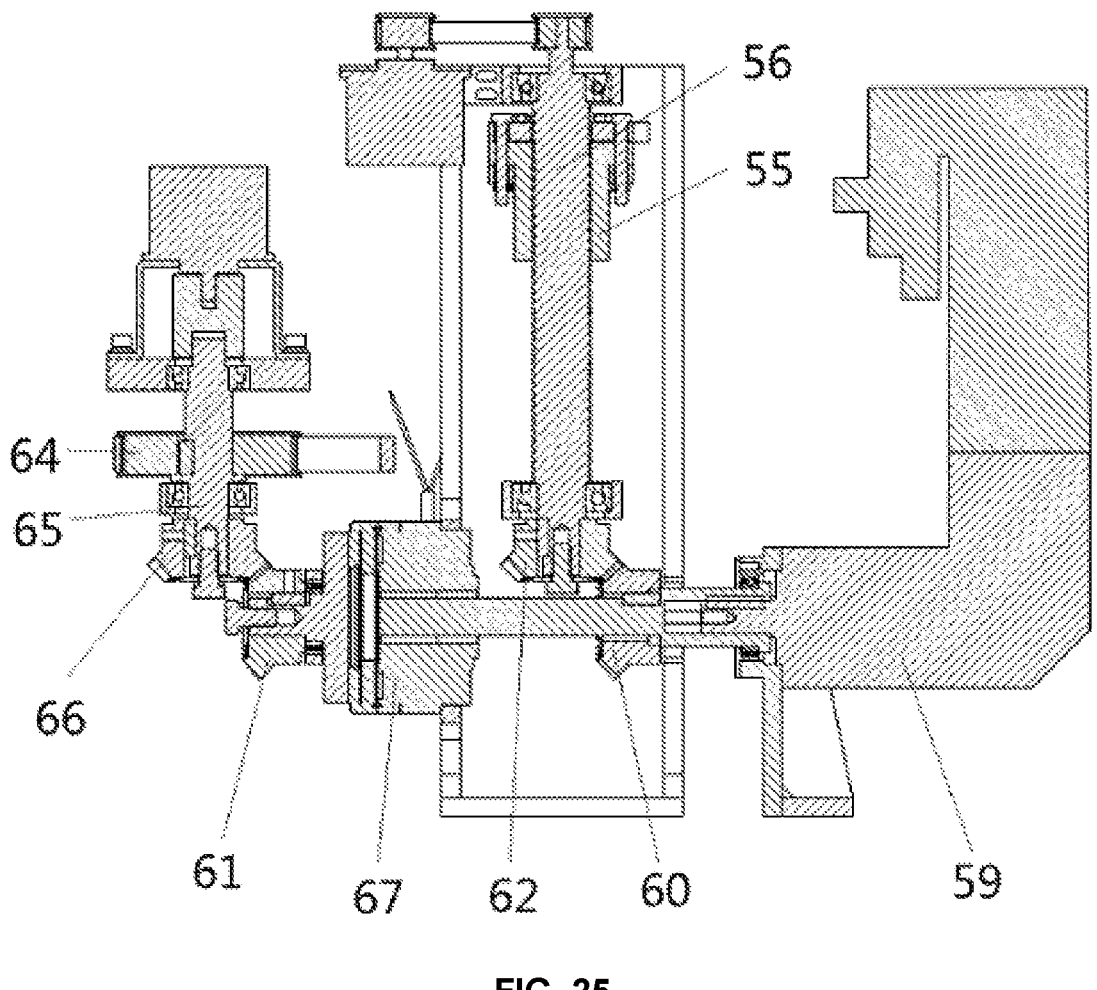
FIG. 25 is a cross-sectional view of a driving mechanism in FIG. 24 in exemplary embodiments of the present application.

FIG. 7 to FIG. 16 are schematic structural diagrams of the fire-fighting robot of the present application. When the present application is used, the valve opening mechanism is installed on the base frame of the chassis, the traveling mechanism is provided on the chassis, the traveling mechanism cooperates with the track, the traveling wheels on both sides of the fire-fighting robot are clamped on the inner side of the track respectively, so that the traveling wheels are in close contact with the track, which facilitates the traveling of the fire-fighting robot. Multiple spiral water intake valves can be set on one track. In exemplary embodiments of the present application, the track may be provided at a higher place while the valve opening mechanism is provided at a lower place. The valve opening mechanism may also be provided at a higher place while the track is provided at a lower place. When the track is provided at a higher place and the valve opening mechanism is provided at a lower place, a groove may be provided in the middle of the traveling wheel, as shown in FIG. 8, and a corresponding protrusion may be provided on the track at a position where the traveling wheel is located to facilitate the traveling wheel to be hung on the track, and the chassis and the track are connected in a position limiting way to prevent the fire robot from falling. The positional relationship between the track and the valve opening mechanism can be set according to actual needs. This embodiment is described with the valve opening mechanism at the top and the track at the bottom. When in use, the traveling mechanism of the fire robot moves on the track for inspection. When the flame detector detects a fire, a signal is transmitted to the control system, the control system senses the spiral water intake valve through the positioning mechanism. In exemplary embodiments, two positioning blocks are provided on the left end and the right end of the upper valve cover, and two positioning proximity sensors are correspondingly provided on the left and right of the base frame. When the base frame approaches from one side (e.g., the left side) of the spiral water intake valve, the positioning block at the left end of the upper valve cover is sensed by the positioning proximity sensor on the right side of the base frame, and the base frame begins to slow down. As the base frame moves from left to right, the positioning block on the right end of the upper valve cover is sensed by the positioning proximity sensor on the right side of the base frame. At the same time, the positioning block on the left end of the upper valve cover is sensed by the positioning proximity sensor on the left side of the base frame, and the base frame stops moving and begins to connect with the spiral water intake valve. The sealing connection mechanism is activated, the control system starts the worm gear motor, and the worm gear motor drives the worm shaft, such that the worm shaft drives the left gear to rotate clockwise and drives the right gear to rotate counterclockwise, which further drives the left rack plate and the right rack plate to move downward synchronously. When the sealing ring at the lower end of the sliding sealing sleeve abuts the upper end surface of the spiral water intake valve, the sliding sealing sleeve is connected with the spiral water intake valve, as shown in FIG. 11. At the same time, the left gear shaft rotates clockwise and the right gear shaft rotates counterclockwise, driving the top of the eccentric wheel to move from the proximal end to the distal end with respect to the center, as shown in FIG. 19, the hook plate frame is driven by the eccentric wheel to rise, the hook plate frame drives the hook plate to rise, as shown in FIG. 20, the hook plate hooks the limit plate, so that the position of the fixing bracket and the spiral water intake valve is fixed, completing the connecting between the base frame and the spiral water intake valve. According to the selected driving method, the screw of the ball screw pair is first driven to rotate, the nut of the ball screw pair drives the spline shaft of the ball spline to move downward through the transmission connecting rod, the spline shaft moves downward with the valve shaft and the valve opening wrench, and the mating connector of the spiral water intake valve enters the valve opening wrench. When the in-place sensor senses the in-place probe rod, a signal is transmitted to the control system. In the following steps, the way of opening and closing the valve may vary depending on the different shapes of the mating connectors. When the spiral water intake valve adopts the first type of mating connector, that is, the mating connector is conical, as shown in FIG. 1 and FIG. 2, at this time, the valve opening mechanism uses the first type of valve opening wrench, that is, the joint connecting groove of the valve opening wrench is also conical, as shown in FIG. 12. After the valve core is inserted into the joint connecting groove in place, the control system controls the screw of the ball screw pair to stop rotating, such that the valve opening wrench does not move downward anymore. At this time, the control system drives the spline shaft of the ball spline pair to rotate, driving the valve opening wrench to rotate, so that one side of the driving block outside the valve opening wrench abuts the baffle block outside the valve core. Then the control system drives the ball screw pair, so that the lifting and rotation are synchronized, the spline shaft moves down and rotates with the valve shaft and the valve opening wrench, and the valve opening wrench urges the driving block along with the baffle block to rotate and move downward, which urges the main valve core to rotate and move down until the main valve sealing stand of the spiral water intake valve is separated from the upper valve cover, and the water flow in the spiral water intake valve enters the water intake channel and the driving mechanism is closed, so that the valve shaft no longer rotates or moves downward, completing the valve opening operation. When the valve is closed with this method, the control system first drives the spline shaft of the ball spline to rotate in an opposite direction, causing the valve opening wrench to rotate in the opposite direction relative to the baffle block, so that the other side of the driving block outside the valve opening wrench abuts the baffle block to continue to drive the spline shaft of the ball spline to rotate. At the same time, the screw of the ball screw is synchronously driven to rotate, causing the valve opening wrench to rotate upward with the mating connector. When the upper end of the main valve sealing stand abuts the lower end of the upper valve cover, at this time, according to the selected driving mechanism, if the ball spline driving motor and the ball screw driving motor are selected, a current loop of the ball spline driving motor senses a current change, and the ball spline driving motor transmits a signal to the control system. If a bidirectional torque limiter is installed on the ball spline driving motor, then the bidirectional torque limiter reaches the limited torque and is disconnected, and the bidirectional torque limiter transmits a signal to the control system such that the control system stops driving the ball spline driving motor. If the main driving motor and the clutch are selected for control, at this time, the current loop of the main driving motor senses the change in current and a signal is transmitted to the control system, the control system controls the clutch to disconnect, the second driving gear stops rotating, then the ball spline pair stops rotating, the spline shaft continues to move up together with the valve shaft and valve opening wrench, the valve opening wrench is separated from the mating connector, the in-place probe rod is not squeezed, the in-place probe rod moves down under the rebound force of the limit spring, the in-place sensor cannot sense the in-place probe rod, the valve opening wrench continues to move upward until the valve closing sensor senses the sensing block on the transmission connecting rod, a signal is transmitted to the control system, the screw of the ball screw pair stops rotating, and the spline shaft no longer rises, so as to achieve the closing the valve and the receiving of the valve shaft in place. When the spiral water intake valve adopts the second type of mating connector, that is, the mating connector is non-conical. In exemplary embodiments, the mating connector is in the shape of a pentagonal pyramid. At this time, the valve opening mechanism uses the second type of valve opening wrench or the third type of valve opening wrench. The mating connector is inserted into the joint connecting groove in place, or the mating connector is inserted into the universal sleeve to lift the core rod of the universal sleeve. After they are connected in place, the control system simultaneously drives the spline shaft of the ball spline pair. At this time, the screw of the ball screw pair is also rotating, the lifting and rotation are synchronized, the spline shaft takes the valve shaft and valve opening wrench to move down and rotate together, the valve opening wrench drives the mating connector, which in turn drives the main valve core to rotate downward, as shown in FIG. 16, the main valve sealing stand downwardly separated from the upper valve cover, the water in the spiral water inlet valve flows through the water intake channel and enters the water intake channel, and the drive mechanism is closed so that the valve shaft no longer rotates or moves downward, thereby completing the opening operation of the valve. When the valve is closed with this method, the driving mechanism drives the screw of the ball screw pair to rotate, and the nut of the ball screw pair drives the spline shaft of the ball spline to move upward through the transmission connecting rod. At the same time, the driving mechanism drives the spline shaft of the ball spline to rotate, the spline shaft takes the valve shaft and the valve opening wrench to rotate and move upward together, causing the mating connector of the spiral water intake valve to rotate upward. When the upper end of the main valve sealing stand abuts the lower end of the upper valve cover, at this time, according to the selected driving mechanism, if the ball spline driving motor and the ball screw driving motor are selected, the current loop of the ball spline driving motor senses the change in current, and the ball spline driving motor transmits a signal to the control system. If the bidirectional torque limiter is installed on the ball spline driving motor, the bidirectional torque limiter reaches the limited torque and is disconnected, the bidirectional torque limiter transmits a signal to the control system, and the control system stops driving the ball spline driving motor. If the main driving motor and the clutch are selected for control, at this time, the current loop of the main driving motor senses the change in current and transmits a signal to the control system, the control system controls the clutch to disconnect, the second driving gear stops rotating, then the ball spline pair stops rotating, the spline shaft continues to take the valve shaft and valve opening wrench to move upward, the valve opening wrench is separated from the mating connector, the in-place probe rod is not squeezed and moves downward under the rebound force of the limit spring, the in-place sensor cannot sense the in-place probe rod, the valve opening wrench continues to move upward until the valve closing sensor senses the sensing block on the transmission connecting rod, a signal is transmitted to the control system, the screw of the ball screw pair stops rotating, the spline shaft no longer rises, closing of the valve is realized, and the valve shaft is retracted in place.

In exemplary embodiments of the present application, the connecting stand of the spiral water intake valve is provided with a water permeable hole, one end of the water permeable hole is connected to the guide groove, and the other end of the water permeable hole is connected to the water flow channel to prevent excessive water in the guide groove and excessive falling pressure of the main valve screw when the main valve screw falls. The spiral valve opening means has a simple structure, does not require the use of springs, has a long service life, is maintenance-free, has no performance degradation, and has good sealing. In the present application, both the in-place sensor and the valve closing sensor can use proximity switches, which have fast response and stable performance. In the present application, the first sliding bar and the second sliding bar can use PTFE strips to reduce the friction between the hook plate frame and the fixing plate, so that the hook plate frame moves up and down more smoothly. The present application has a simple structure and uses two driving motors or a driving motor cooperating with a clutch to realize the lifting/lowering and connecting of the valve shaft and the spiral opening and closing of the valve. Compared with the existing method of directly jacking up the valve to take water, good sealing performance and no water leakage are achieved. In addition, by adjusting the speed of the motor, spiral motion with different leads can be realized. By rotating the valve to open, the pressure of opening the valve is reduced. By adopting a positioning mechanism, a sealing connection mechanism, and a limiting and fixing mechanism, autonomous connecting to the spiral water intake valve on the track, accurate connecting, good sealing, automatic valve opening, timely fire extinguishing, and long service life can be realized.

Due to the above-mentioned structure, the present application has the advantages of ingenious structure, maintenance-free, automatic alignment, accurate and fast alignment, good sealing, long service life, no performance degradation, and low use cost.

What is claimed is:

1. A spiral water intake valve comprising:
   a valve body;
   a main valve core provided in the valve body; and
   a spiral water intake mechanism provided in the valve body,
   the spiral water intake mechanism includes a mating connector and a connecting stand,
   the main valve core includes a main valve sealing stand and a main valve screw,
   the mating connector is provided at an upper end of the main valve sealing stand,
   a lower end of the main valve sealing stand is fixedly connected to the main valve screw, a water intake channel is provided in a center part of an upper valve cover of the valve body, the mating connector is placed in the water intake channel, a lower end of the mating connector is fixedly connected to the main valve sealing stand, the main valve sealing stand is connected to the upper valve cover in a sealed way, the connecting stand is provided at a lower end of the main valve screw, a guide groove is provided in a center part of the connecting stand, a water permeable hole is provided at a lower end of the connecting stand, the lower end of the connecting stand is connected to a lower valve cover of the valve body in a sealed and fixed way, an inner wall of the guide groove is provided with threads, the water permeable hole is connected with the guide groove, and the lower end of the main valve screw is placed in the guide groove and connected to the connecting stand.

2. The spiral water intake valve according to claim 1, further comprising:

a guide ring provided on an upper end surface of the main valve sealing stand, an outer end surface of the guide ring is inclined outward from top to bottom, and a lower end of the guide ring is fixedly connected to the main valve sealing stand, when the main valve sealing stand rises, the main valve sealing stand is connected to the upper valve cover in a sealed way, and an outer wall of the guide ring abuts an inner wall of the water intake channel for position limiting.

3. The spiral water intake valve according to claim 1, further comprising:

a connecting sleeve is provided between the main valve screw and the connecting stand, the connecting sleeve is placed in the guide groove, an outer wall of the connecting sleeve is fixedly connected to the guide groove, an inner wall of the connecting sleeve is provided with threads, and the connecting sleeve is threadedly connected to the main valve screw.

4. The spiral water intake valve according to claim 1, further comprising:

a sealing gasket fixedly provided on the main valve sealing stand, wherein the main valve sealing stand is connected to the upper valve cover of the valve body through the sealing gasket in a sealed way.

5. The spiral water intake valve according to claim 4, wherein:

the sealing gasket is in a form of a sleeve, the sealing gasket is placed on the main valve sealing stand and is fixedly connected to the main valve sealing stand, and the upper end of the main valve sealing stand is connected to the upper valve cover through the sealing gasket.

6. A fire-fighting robot comprising:

a chassis;

a track;

a control cabin and a water cannon provided on the chassis;

a traveling mechanism is provided at a lower end of the chassis, the traveling mechanism cooperates with the track a control system provided in the control cabin;

the spiral water intake valve according to claim 1 provided on the track, the spiral water intake valve is fixedly connected to the track; and a valve opening mechanism provided on the chassis, the valve opening mechanism includes a fixing stand and a valve shaft, the fixing stand is fixedly connected to a base frame of the chassis, a valve shaft hole is provided in the fixing stand, a water inlet channel is provided in the fixing stand, a water outlet channel is provided on one side of the fixing stand, one end of the water outlet channel is connected to a water inlet of the water cannon, the other end of the water outlet channel is connected to the water inlet channel, the valve shaft is placed in the valve shaft hole and is connected to the valve shaft hole in a sealed and slidable way, an upper end of the valve shaft passes through the fixing stand, the fixing stand is provided with a lifting and rotating mechanism, a lower end of the valve shaft is provided with a valve opening wrench, the valve shaft is connected to the lifting and rotating mechanism, the lifting and rotating mechanism is connected to the control system, an upper end of the valve opening wrench is fixedly connected to the valve shaft, a lower end of the valve opening wrench extends out of the water inlet channel and is mated with and connected to the mating connector of the spiral water intake valve, the valve opening mechanism is connected to the spiral water intake valve, the water inlet channel is connected with the water intake channel, the lifting and rotating mechanism drives the valve shaft and the valve opening wrench, and the valve opening wrench drives the main valve core to rotate downward to be separated from the upper valve cover, so that water in the track enters the water inlet channel through the water intake channel, and then enters the water cannon through the water outlet channel, so as to realize firefighting operations.

7. The fire-fighting robot according to claim 6, further comprising:

a sealing connection mechanism provided between the spiral water intake valve and the valve opening mechanism.

8. The fire-fighting robot according to claim 7, wherein:

the sealing connection mechanism includes a sliding sealing sleeve, a sealing ring, a left rack plate, a right rack plate, fixing brackets, a left gear, a left gear shaft, a left worm wheel, a right gear, a right gear shaft, a right worm wheel, a worm shaft, and a worm motor, the sliding sealing sleeve is provided on the outside of the fixing stand, an inner wall of the sliding sealing sleeve is connected with an outer wall of the fixing stand in a sealed and slidable way, the sealing ring is fixedly provided at a lower end of the sliding sealing sleeve, the sliding sealing sleeve falls such that the sealing ring is abutted against and connected to the upper valve cover of the spiral water intake valve in a sealed way,

27 the left rack plate and the right rack plate are provided on a left side and a right side of the sliding sealing sleeve,
the fixing brackets are provided on a front side and a rear side of the sliding sealing sleeve respectively,
the fixing brackets are fixedly connected to the base frame,
a right end of the left rack plate is fixedly connected to the sliding sealing sleeve,
the left gear is provided at a left end of the left rack plate,
the left gear engages with an upper rack of the left rack plate,
the left gear is fixed on the left gear shaft,
two ends of the left gear shaft are fixedly connected to the fixing brackets on both sides through bearings,
the left worm wheel is fixedly provided at one end of the left gear shaft that passes through and extends out of one of the fixing brackets,
a left end of the right rack plate is fixedly connected to the sliding sealing sleeve,
the right gear is provided at a right end of the right rack plate,
the right gear engages with an upper rack of the right rack plate,
the right gear is fixed on the right gear shaft,
two ends of the right gear shaft are fixedly connected to the fixing brackets on both sides through bearings,
the right worm wheel is fixedly provided at one end of the right gear shaft that passes through and extends out of the one of the fixing brackets,
the worm shaft is provided on the left worm wheel and the right worm wheel,
left helical teeth and right helical teeth are fixed at intervals on the worm shaft,
a helical direction of the left helical teeth is opposite to a helical direction of the right helical teeth,
the left helical teeth engage with the left worm wheel,
the right helical teeth engage with the right worm wheel,
two ends of the worm shaft are fixedly connected to the one of the fixing brackets through bearings,
one end of the worm shaft that passes through and extends out of the one of the fixing brackets is driven by the worm motor, and
the worm motor is fixed on the base frame and connected to the control system.
9. The fire-fighting robot according to claim 8, further comprising:
a limiting and fixing mechanism provided between the spiral water intake valve and the valve opening mechanism,
the limiting and fixing mechanism includes hook plate frames, guide sliding mechanisms, hook plates, limit plates, and eccentric wheels,
the hook plate frames are provided in a front side and a back side of the sliding sealing sleeve respectively,
the guide sliding mechanisms are provided between the hook plate frames and the fixing brackets,
the hook plate frames are slidably connected to the fixing brackets through the guide sliding mechanisms,
a lower end of each of the hook plate frames extends toward a center of the sliding sealing sleeve to form the hook plates,
a front side and a rear side of the upper valve cover of the spiral water intake valve extend outward to form the limit plates,
limiting wheel holes are provided in the hook plate frames at intervals,

the eccentric wheels are fixedly provided at a front end and a rear end of the left gear shaft,
the eccentric wheels are fixedly provided at a front end and a rear end of the right gear shaft,
the eccentric wheels are placed in the limiting wheel holes,
when a top of the eccentric wheels turns from a proximal end to a distal end with respect to the center, the hook plate frames move upward with the eccentric wheels, and
an upper end surface of the hook plates abuts a lower end surfaces of the limit plates to realize a position-limited fixed connection between the fixing brackets and the spiral water intake valve.
10. The fire-fighting robot according to claim 6, wherein:
the valve shaft is provided with a detection hole in an axial direction,
the valve shaft is provided with an in-place sensor and an in-place probe rod from top to bottom,
the in-place sensor is fixedly connected to an inner wall of the valve shaft in a sealed way,
the in-place probe rod is provided below the in-place sensor,
a baffle ring is fixedly provided on the inner wall of the valve shaft below the in-place sensor,
the in-place sensor is connected to the control system,
an outer diameter of an upper part of the in-place probe rod is less than an outer diameter of a middle part of the in-place probe rod,
the outer diameter of the middle part of the in-place probe rod is less than an inner diameter of the baffle ring,
a limit spring is provided between the upper part of the in-place probe rod and the baffle ring,
the limit spring is fitted over the upper part of the in-place probe rod as a sleeve in a compressed state,
an upper end of the in-place probe rod passes through the limit spring and the baffle ring and is placed below the in-place sensor,
the in-place probe rod is slidably connected to the valve shaft,
a lower end of the in-place probe rod passes through the valve shaft and is connected to the valve opening wrench, and
after the valve opening wrench is connected to the mating connector, the mating connector is configured to drive the in-place probe rod to move upward to be sensed by the in-place sensor, thereby realizing an in-place connection.
11. The fire-fighting robot according to claim 10, further comprising:
a probe rod hole is provided in a middle of the valve opening wrench,
the probe rod hole is connected with the detection hole,
a joint connecting groove is provided at a lower end of the valve opening wrench,
the joint connecting groove is matched with and connected to the mating connector,
an upper end of the joint connecting groove is connected with the probe rod hole,
the outer diameter of a lower part of the in-place probe rod is less than the outer diameter of the middle part of the in-place probe rod, the probe rod hole is smaller than the outer diameter of the middle part of the in-place probe rod, and
the lower end of the in-place probe rod passes through the probe rod hole and is placed in the joint connecting groove to abut the mating connector.

12. The fire-fighting robot according to claim 6, further comprising:

a driving block (79) is radially fixedly provided at an outer wall of the lower end of the valve opening wrench, a baffle block (80) is fixedly provided at the upper end of the main valve sealing stand, and after the valve opening wrench is connected to the mating connector, the driving block abuts the baffle block, thereby driving the main valve sealing stand to rotate and move up and down.

13. The fire-fighting robot according to claim 6, wherein the valve opening wrench is a universal sleeve.

14. The fire-fighting robot according to claim 7, wherein:

the lifting and rotating mechanism includes a ball spline pair, bearings, a bearing stand, a spline pulley, a ball screw pair, a transmission connecting rod, and a driving mechanism, the ball spline pair is provided at the upper end of the valve shaft, the upper end of the valve shaft is fixedly connected to a lower end of a spline shaft of the ball spline pair, an upper end of the spline shaft is fixedly connected to the bearing stand through the bearings, a spline shaft nut of the ball spline pair is fixedly connected to the fixing stand through the bearings, the spline pulley is fixedly provided on an outer wall of the spline shaft nut, the ball screw pair is provided on one side of the bearing stand, the bearing stand is fixedly connected to a nut of the ball screw pair through the transmission connecting rod, and screws of the ball screw pair are connected to the fixing stand through the bearings and a bracket, the spline pulley and the screws of the ball screw pair are respectively driven by the driving mechanism.

15. The fire-fighting robot according to claim 14, wherein:

the driving mechanism includes a ball screw driving motor and a ball spline driving motor, the ball screw driving motor and the ball spline driving motor are respectively connected to the control system, the screws of the ball screw pair is driven by the ball screw driving motor, and the spline pulley is driven by the ball spline driving motor through gear transmission.

16. The fire-fighting robot according to claim 14, wherein:

the spline pulley is connected to a spline driving pulley through a synchronous belt, the spline driving pulley is fixed on a spline driving pulley shaft, and a bidirectional torque limiter is mounted on the spline driving pulley shaft, and the bidirectional torque limiter is connected to the control system.

17. The fire-fighting robot according to claim 14, wherein:

the driving mechanism also includes a main driving motor, a first driving gear, a clutch, a second driving gear, a first driven gear, a synchronous belt, a spline driving pulley, a spline driving pulley shaft, and a second driven gear, the main driving motor is provided on one side of the fixing stand, the main driving motor is connected to the control system, the main driving motor is connected to the fixing stand through a bracket, the first driving gear and the clutch are separated from each other and provided on an output shaft of the main driving motor, the first driving gear is fixedly connected to the output shaft of the main driving motor, the first driving gear engages with the first driven gear, the first driven gear is fixedly connected to the screws of the ball screw pair, the clutch is fixedly connected to the output shaft of the main driving motor, the clutch is connected to the control system, the second driving gear is fixed on an output shaft of the clutch, the spline pulley is connected to the spline driving pulley through the synchronous belt, the spline driving pulley is fixed on the spline driving pulley shaft, the second driven gear is provided at a lower end of the spline driving pulley shaft, the second driven gear is fixedly connected to the spline driving pulley shaft, and the second driven gear engages with the second driving gear.

18. The fire-fighting robot according to claim 14, wherein:

the screws of the ball screw pair is fixedly connected to a bracket through a bearing and a screw bearing stand, the bracket is fixedly connected to the fixing stand, a valve closing sensor is provided on the screw bearing stand at an upper end of the screws, the valve closing sensor is connected to the control system, a sensing block is fixedly provided on the transmission connecting rod, and the sensing block cooperates with the valve closing sensor.

19. The fire-fighting robot according to claim 9, further comprising:

limit baffles respectively provided on a front side and a rear side of a lower end of the limiting wheel holes, the limit baffles are fixedly connected to the hook plate frames, a lubricating oil groove is formed between two of the limit baffles and the limiting wheel holes, lubricating oil is provided in the lubricating oil groove, and when the eccentric wheels rotate, the eccentric wheels come into contact with the lubricating oil in the lubricating oil groove.

20. The fire-fighting robot according to claim 9, further comprising:

at least one pressing mechanism (43) is provided at an upper end of the hook plate frames, the at least one pressing mechanism includes an upper connecting stand, at least one lower connecting stand, and at least one spring, the at least one lower connecting stand is provided on the hook plate frames, the at least one lower connecting stand is fixedly connected to the hook plate frames, the at least one spring is provided on the at least one lower connecting stand, the upper connecting stand is provided on the fixing brackets, the upper connecting stand is fixedly connected to the hook plate frames, the upper connecting stand is opposite to the at least one lower connecting stand, the at least one spring is in a compressed state, one end of the at least one spring is fixedly connected to the upper connecting stand, and the other end of the at least one spring is fixedly connected to the at least one lower connecting stand.

21. The fire-fighting robot according to claim 9, wherein:

each of the guide sliding mechanisms includes first sliding bars, a sliding limit block, and a front and rear limit sliding mechanism, the sliding limit block is provided at a middle part of the fixing brackets, a guide groove is provided at a middle part of the hook plate frames, the first sliding bars are respectively fixedly provided on a left side and a right side of an inner wall of the guide groove, the sliding limit block is placed in the guide groove and is slidably connected to the guide groove through the first sliding bars, the sliding limit block is fixedly connected to the fixing brackets, the front and rear limit sliding mechanism includes second sliding bars and sliding limit stands, the sliding limit stands are provided at both ends of the fixing bracket, the sliding limit stands are fixedly connected to the fixing brackets, open limiting grooves facing toward the hook plate frames are provided between the sliding limit stands the fixing brackets, the second sliding bars are fixedly provided on a front side and a rear side of the open limiting grooves respectively, and a left end and a right end of the hook plate frames are respectively placed in the open limiting grooves and are slidably connected to the open limiting grooves through the second sliding bars.

22. The fire-fighting robot according to claim 7, further comprising:

a positioning mechanism provided between the spiral water intake valve and the valve opening mechanism, the positioning mechanism includes positioning blocks and a positioning proximity sensor, the positioning blocks are respectively provided at a left end and a right end of the upper valve cover of the spiral water intake valve, the positioning blocks are fixedly connected to the upper valve cover, the positioning proximity sensor is provided on the base frame above the positioning blocks, the positioning proximity sensor cooperates with the positioning blocks, the positioning proximity sensor is fixedly connected to the base frame, and the positioning proximity sensor is connected to the control system.

23. The fire-fighting robot according to claim 7, further comprising:

a video intercom device and a flame detector fixedly provided on the base frame, the video intercom device and the flame detector are respectively connected to the control system.

24. The fire-fighting robot according to claim 7, further comprising: a protective cover is fixedly provided on an outside of the base frame.

* * * * *